Aug. 2, 1960 C. E. HASTINGS 2,947,984
RADIO POSITION DETERMINING SYSTEM
Filed March 22, 1957 10 Sheets-Sheet 1

INVENTOR
*C. E. Hastings*

BY *Cushman, Darby & Cushman*
ATTORNEYS

Aug. 2, 1960  C. E. HASTINGS  2,947,984
RADIO POSITION DETERMINING SYSTEM
Filed March 22, 1957  10 Sheets-Sheet 2

INVENTOR
*C. E. Hastings*

INVENTOR
C.E. HASTINGS

Aug. 2, 1960   C. E. HASTINGS   2,947,984
RADIO POSITION DETERMINING SYSTEM
Filed March 22, 1957   10 Sheets-Sheet 4
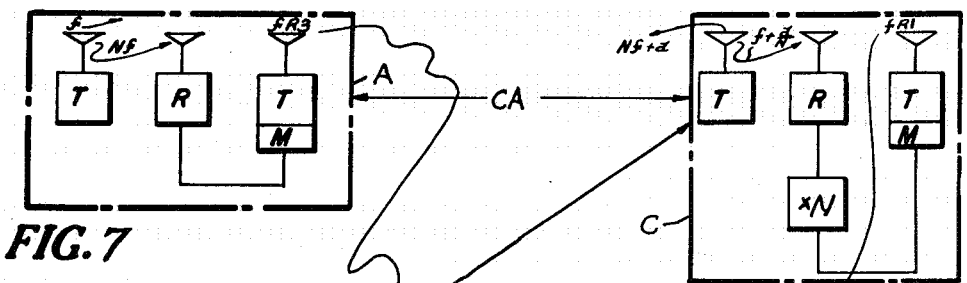
FIG. 7
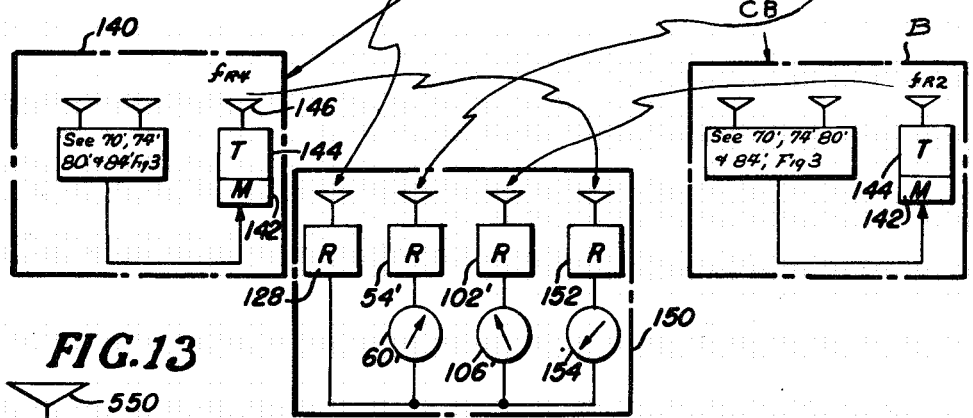
FIG. 13
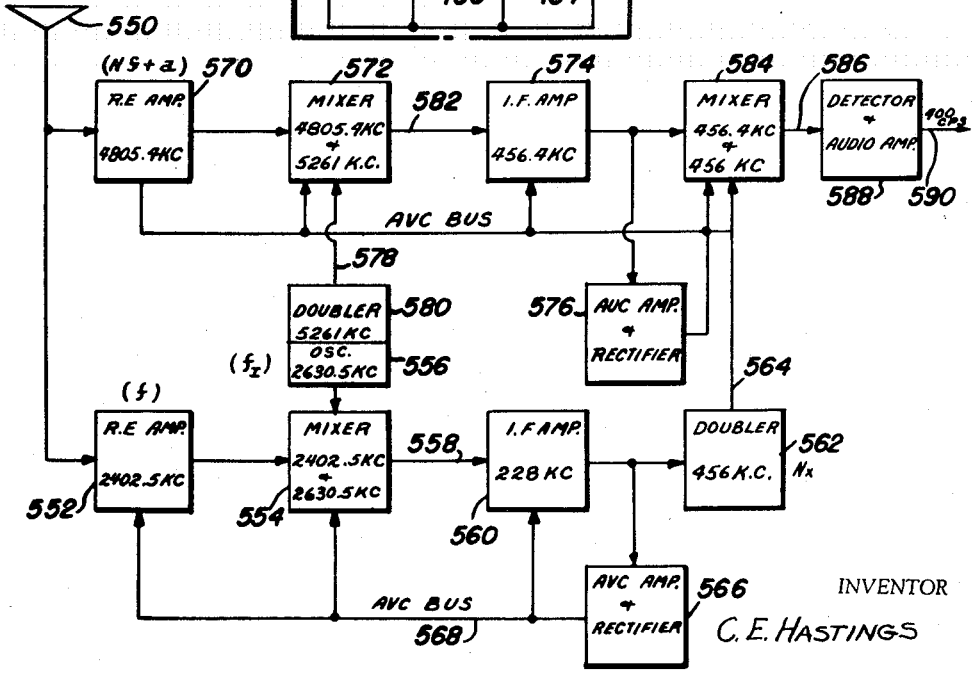
INVENTOR
C. E. HASTINGS United States Patent Office 2,947,984
Patented Aug. 2, 1960

2,947,984

RADIO POSITION DETERMINING SYSTEM

Charles E. Hastings, % Hastings-Raydist, Inc., Hampton, Va.

Filed Mar. 22, 1957, Ser. No. 648,484

39 Claims. (Cl. 343—105)

This invention pertains to radio systems for navigation, location, tracking and like purposes and particularly to such systems of the continuous wave type.

This application is a continuation-in-part of my application Serial No. 439,036, filed June 24, 1954, for Radio Navigation System (now abandoned).

In United States Patents 2,527,548, 2,528,140 and 2,528,141 all assigned to the assignee of the present application, there are described and claimed continuous wave radio systems for navigation and like position determining purposes operating upon what has come to be referred to in the art as the heterodyne phase comparison principle. These patents, and particularly United States Patent 2,528,141, explain hyperbolic, elliptical and circular navigation systems; that is, systems wherein navigation along hyperbolic, elliptical or circular lines or paths will produce no change in the indication of a phase angle determining device. Operation according to said patents by use of hyperbolic and elliptical overlays will provide extremely accurate navigational data.

As is now well known, systems operating according to said heterodyne phase comparison principle permit the determination of positional fixes accurate to a few inches at ranges where radar equipment is accurate at best only to fifty or more feet.

A feature of the present invention constitutes a further improvement upon such radio systems in providing one which provides determination of distance from a mobile craft to two or more fixed stations without the necessity of hyperbolic, elliptical or circular overlays. According to this feature of the invention, at least two stations are positioned at spaced apart points as along a shore line and a further station is located in a mobile craft. In fact, there may be a plurality of mobile craft having such stations. Water craft and aircraft are exemplary. The system is adapted for measurement in three dimensions by use of additional stations, thus providing means for navigation of aircraft both in azimuth and altitude.

Briefly, use of the aforesaid stations can provide a pattern of concentric circles of zero phase shift about one of the fixed stations, and a pattern of hyperbolic lines of zero phase shift about two fixed stations as foci. And/or, elliptical lines can be established on the fixed station as foci. Three combinations exist: Circular-hyperbolic; circular-elliptical; hyperbolic-elliptical. By use of phase comparison methods according to the invention the distance from the mobile craft to the station forming the center of concentric circles is measured in terms of absolute range and absolute range to the other of the shore stations can be mathematically, electrically or mechanically determined by further use of phase comparison devices operating in response to the existence of the mobile craft on any two of circular, hyperbolic or elliptical positional lines. A unique feature of the invention is that hyperbolic and/or elliptical overlays are not required to obtain positional data.

Accordingly it is a primary object of this invention to provide improved continuous wave radio systems for navigation and the like.

It is a further object of this invention to provide improved radio navigation systems operating upon the heterodyne phase comparison principle wherein absolute range from two spaced points to a third point may be directly determined without use of hyperbolic, elliptical or circular overlays.

It is a further object of the invention to provide means for resolution of lane ambiguity in the aforesaid systems according to the invention.

Further objects and the entire scope of the invention will be in part obvious and in part expressed in the following detailed description and in the appended claims.

The various features of exemplary embodiments of the invention may be best understood with reference to the accompanying drawings, wherein:

Figure 7 shows a three-dimensional system operating upon the principle of the system shown in Figures 5 and 6.

Figure 13 shows a receiver suitable for use in equipment according to the invention.

Figure 1:
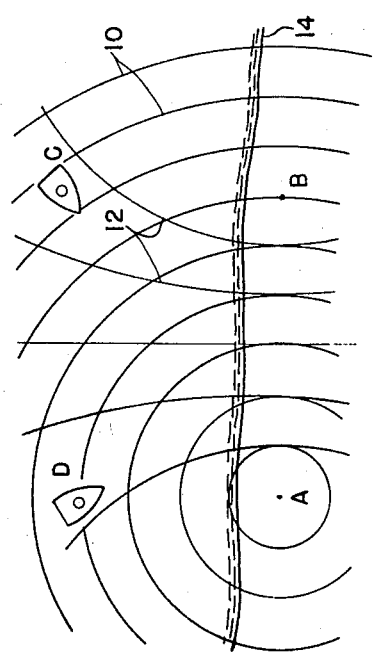
Figure 1 shows diagrammatic layout for a circular-hyperbolic system.

A layout in terms of positional lines of zero phase shift is set out in Figure 1 for a circular-hyperbolic system. Exemplary circular positional lines of zero phase shift are designated 10, and hyperbolic lines 12. Fixed stations A and B are spaced apart as shown and form the foci of the hyperbolas. Station A forms the center of the circles. In addition, two exemplary mobile craft are shown stations C and D. For convenience, these are shown as boats and the shore line between water and land is indicated at 14.

The expression "positional line of zero phase shift" is employed inasmuch as movement of station C or D along a hyperbolic path with stations A and B as foci will result in no change in the output of a phase angle determining device used as part of the system (such device will be termed "phasemeters" hereinafter for convenience). Similarly, navigation of station C or D along a circular path with station A as center will result in zero deviation of a "circular" or "range" phasemeter.

Figure 2:
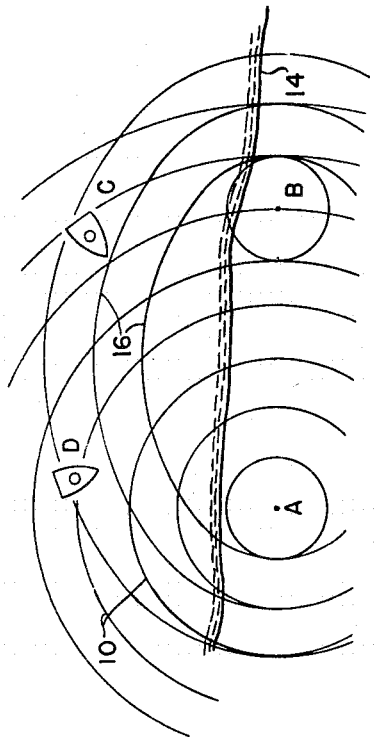
Figure 2 shows diagrammatic layout for a circular-elliptical system.

Figure 2 shows a circular-elliptical system. Navigation of stations C or D along a circular path about station A will result in zero phase shift of the circular phasemeter of the system, or navigation along elliptical paths 16 with stations A and B as foci will result in zero deviation of an "elliptical" phasemeter of the system.

Figure 3:
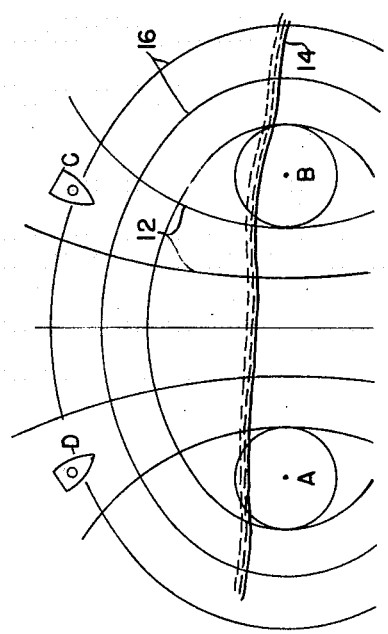
Figure 3 shows diagrammatic layout for an ellipitical-hyperbolic system.

Figure 3 shows a combined hyperbolic-elliptical system with stations A and B as foci.

Figure 4:
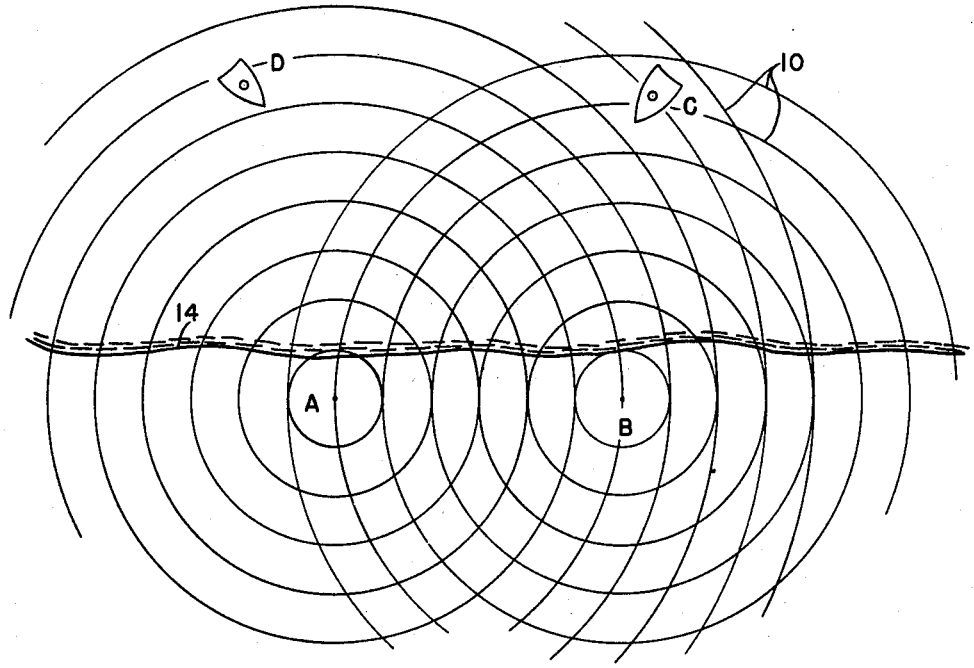
Figure 4 shows diagrammatic layout of a circular-circular system.

Figure 4 shows two sets of concentric circles, one about station A and one about station B. As will be explained hereinbelow, this result can be achieved in effect by interconnection of the phasemeters of a circular-hyperbolic system (Fig. 1), a circular-elliptical system (Fig. 2), or a hyperbolic-elliptical system (Fig. 3). A circular-circular system in Figure 4 can also be created by having two complete circular systems, one between stations A and C, or A and D, and the other between stations C and B, or D and B. However, to this extent this is a duplication of range equipment per se and is not a subject of this application.

Figure 5:
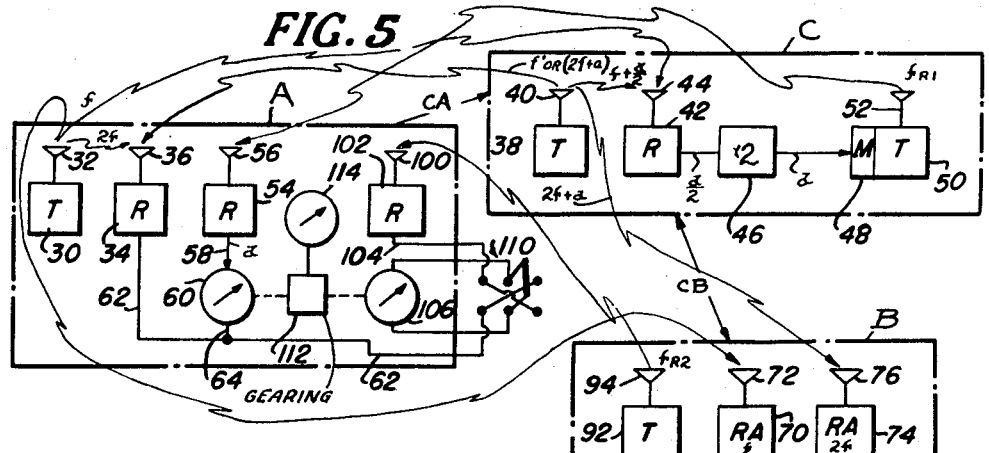
Figure 5 shows one embodiment of an exemplary system according to the invention.

Exemplary equipment for one embodiment of a representative system will now be described with reference to Figure 5. The arrangement of equipment in Figure 5 is shown to correspond to that of Figures 1–4. That is, one station—a mobile range station which may be on a boat or aircraft—is designated by C, another or fixed range station is designated A, and another fixed station, conveniently termed a relay station, is designated B.

Station A includes a transmitter 30 tuned to transmit from antenna 32 a radio carrier frequency $f$. For example, this frequency may be 2,000 kc. Transmitter 30 is so designed that a limited amount of second harmonic $2f$ wil also be radiated from the antenna 32.

Station A further includes a receiver 34 having antenna 36, these components being arranged to receive the previously mentioned radio carrier frequency $2f$ from transmitter antenna 32. Receiver 34 will also detect excursions of frequency $2f$ within limits of low frequencies discussed hereinbelow.

Station C includes transmitter 38 tuned to transmit from antenna 40 a frequency $(2f+a)$, the part $a$ being, for example, 800 cycles per second. However, transmitter 38 is so constructed that there is also radiated from antenna 40 a limited amount of energy at one-half the primary frequency, or $$\left(f+\frac{a}{2}\right)$$

More than said limited amounts of signal at $2f$ and $$\left(f+\frac{a}{2}\right)$$

may be radiated from antennae 32 and 40, respectively, without affecting the systems. However, additional frequency allocations then may be required, which are better avoided.

Station C further includes receiver 42 having antenna 44 tuned to receive frequencies $f$ from transmitter 30 and $$\left(f+\frac{a}{2}\right)$$

from transmitter 38.

Receiver 34 at station A by means of antenna 36 receives frequency $(2f+a)$ from transmitter 38 and frequency $2f$ from transmitter 30. With the arrangement as thus far described and with the further provision of frequency doubler circuit 46, modulator 48 and relay transmitter 50 at station C, the heterodyne frequency $(a/2)$ detected in receiver 42 is doubled in circuit 46 to become $a$ and this frequency is modulated, preferably frequency modulated, at circuit 48 onto a carrier frequency $f_{R1}$ and transmitted from antenna 52. Frequency $f_{R1}$ is a relay frequency and is distinct from previously mentioned radio carriers $f$ and $2f$.

At station A receiver 54 is provided with antenna 56 for receiving the frequency $f_{R1}$, and the receiver is tuned to receive $f_{R1}$ to the exclusion of other frequencies. Detection in receiver 54 provides as an output the frequency $a$, other beat frequencies being suppressed by any convenient means in receiver 54. The output of receiver 54 is on line 58 which is connected as one input to a phase angle measuring device 60.

With equipment as thus far described in detail as included at stations A and C, and understanding that the antennae 32 and 36 at station 12 are positioned close together, and the antennae 40 and 44 at station 10 similarly positioned close together, a pure range system having circular positional lines of zero phase shift concentrically arranged about station A as a center, is provided.

It will be understood that transmitter 30 and receiver 34 may share the same antenna, as may transmitter 38 and receiver 42, all according to principles known in the radio art.

Range or circular systems embodying the equipment as thus far described are fully explained in the above mentioned Patent 2,709,253. As is fully developed in that patent the absolute range CA between stations A and C may be determined.

The present invention includes as a basic component the relay station B which has been previously mentioned. This station includes a first radio frequency amplification circuit 70 coupled to antenna 72 and a second radio frequency amplification circuit 74 coupled to antenna 76 (or to one antenna). Amplification circuit 70 is tuned to amplify only frequency $f$ received by antenna 72 from transmitter 30. The output frequency $f$ on line 78 is doubled in frequency doubler circuit 80 and is applied over line 82 as one input to heterodyne detector circuit 84. The frequency on line 82 is $2f$. Amplification circuit 74 is tuned to amplify only radio frequency $2f$ plus or minus the low frequency $a$ or the like. This frequency is received by antenna 76 from transmitter 38. The output of amplification circuit 74 on line 86 is connected as the second input to detector circuit 84. The output of detector circuit 84 appears on line 88 and is frequency $a$. By means of modulator circuit 90 frequency $a$ is modulated onto the transmission from transmitter 92 radiated from antenna 94. The transmitter 92 operates at a radio carrier frequency $f_{R2}$ which is distinct from the frequencies $f$, $2f$ and $f_{R1}$ in the general case. The radiation from antenna 94 is received at antenna 100 coupled to receiver 102 at station A. Receiver 102 detects only frequency $f_{R2}$ to the exclusion of other frequencies. The output of receiver 102 is on line 104 which is frequency $a$, suitable circuits being included in receiver 102 for suppressing other frequencies. Line 104 is connected as one input to a second phase measuring device 106. The previously mentioned line 62 is connected to the phase measuring device 106 to serve as the second input thereto. It will be recalled that line 62 carries frequency $a$ derived from receiver 34.

The operation of the equipment thus far described in detail can now be summarized: As previously mentioned, phase measuring device 60 indicates in terms of absolute range in a "circular" system between stations A and C. Thus phase measuring device 60 can be said to indicate the absolute value of range CA between stations A and C. Also, by virtue of mobile transmitter 38 on the moving station C, fixed or reference transmitter 30 and the fixed receiver 34, all at station A and radio frequency amplifiers 70 and 74 at station A and radio frequency amplifiers 70 and 74 at station B, a hyperbolic system is established with foci at stations A and B. This type of system is fully developed in the aforementioned United States Patent 2,528,141, except that in the present case the foci receiver at station 14 in the end heterodynes between frequencies $f$ and $2f+a$ to provide the heterodyne frequency $a$. From this it is apparent that phase measuring device 106 indicates hyperbolic lines of position with the stations A and B as foci, as just stated. Thus, using the circular indications of device 60 and the hyperbolic indications of device 106, the operator of the system may directly read the range from the mobile station C to the fixed stations A and B. This is so because the phase measuring device 106 directly indicates the distance CA—CB, where CB is the distance between stations C and B. It is thought unnecessary to develop this fact mathematically, it being apparent that where the absolute distance between station C and A is known and it is known that the station C is on a given hyperbolic line of position, the distance CB is determinable. The distance between stations A and B, AB, is of course known.

In the event that the mobile station C may be closer to station A than to station B, it may be desired to have the phase measuring device 106 indicate CB—CA instead of CA—CB. This may be accomplished by the provision of a double pole double throw reversing switch 110 for reversing the input connections to the phase measuring device. In this case the readings of phase measuring devices 60 and 106 may be added to obtain an indication of CB.

It will be understood that the values of CA and CA—CB may be directly read from the phasemeters if the latter are properly calibrated. If both phasemeters read in electrical phase angles instead of distance, it is necessary to take into account the difference in range and hyperbolic coefficients. As will be shown hereinbelow, the hyperbolic reading in terms of an electrical angle must be multiplied by 2, or at least nearly so. This multiplication may be accomplished by multiplying the hyperbolic indication by 2, then performing the subtractions (or addition) and then multiplying by a single coefficient. If, however, a mechanical differential (or adding device) is used between the hyperbolic and range indicators, the indication of the hyperbolic phase angle must somehow be multiplied by 2 before applying to the differential. There are at least two ways for doing this. A mechanical gear arrangement can be used to double the shaft revolutions before application to the differential. Or, the beat frequencies, $a$, may be doubled to $2a$ before application to the hyperbolic phasemeter. This would in itself double the rate of the phasemeter shaft rotation. There are, of course, other equivalent methods, and no limitation is intended.

To automatically record the difference in readings between phase measuring devices 60 and 106 a conventional differential gear arrangement designated by block 112 may be interconnected between devices 60 and 106 and further connected to rotate indicator 114. Thus device 114 will directly indicate D at all times. In the case where the input to device 106 is reversed for directly indicating CB—CA, in other words, for adding the indications of devices 60 and 106, any one of several well known shaft rotation adding gear arrangements can be provided for use in place of differential gearing 112 to cause device 114 to show an addition of the readings of devices 60 and 106. This technique may be applied to all embodiments of the invention hereindescribed and equivalents thereof.

The embodiment of the invention described in detail with reference to Figure 5 is one example of a more general case. The general case will now be described with reference to Figure 6.

Figure 6:
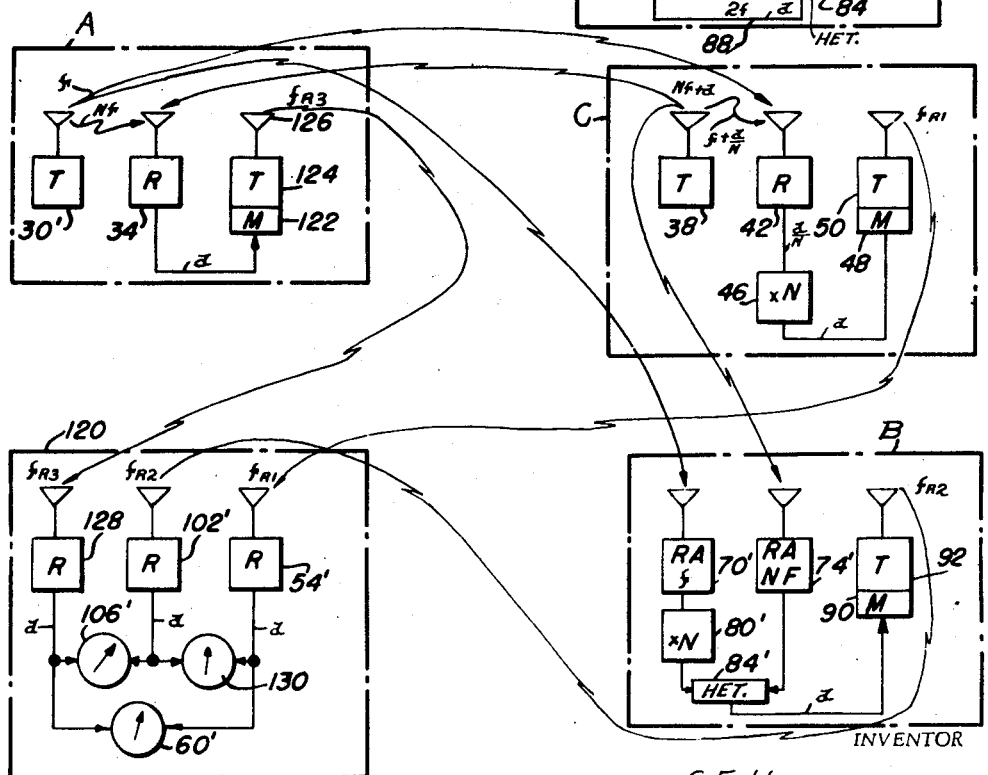
Figure 6 shows a more generalized presentation of a system according to the invention.

In Figure 6 mobile station C, fixed station A and fixed station B are illustrated. In addition, the indicating equipment is shown at a discrete station 120. At the outset it may be stated that in all phase heterodyne comparison systems as described in the aforementioned patents, the accuracy of the system is determined by the positions of what may be termed the navigating or positional transmitters and navigating or positional receivers. For example, referring now to Figure 5 of the present application, transmitters 30 and 38 are the positional or navigating transmitters and receivers 34, 42 and the receiver incorporating radio frequency amplifiers 70 and 74 are the positional or navigating receivers. The positions in space of the transmitter antennae and receiver heterodyne points associated with these components controls the accuracy of the system. On the other hand, the physical disposition of the relay transmitters 50 and 92 and the relay receivers 54 and 102 are immaterial and may be located at any point without introducing anything other than the negligible errors. Thus, the provision in Figure 6 of separate station 120 for the indicating equipment serves to demonstrate that once the vital beat or heterodyne frequencies are detected, they may be relayed to any convenient point. In other words, the indicating equipment in the given example may be at stations A, B or C, or any other point. In fact some indicating equipment may be at one point and other of it at another point, to cite an extreme example.

In Figure 6 station C is as shown in Figure 5, except that the more general case of frequency $(Nf+a)$ is proposed. N is preferably any low integer such as 2 or 3. However, it is quite feasible to use fractional values such as ⅔, ¾, etc. It is also quite feasible to use higher integral values such as 10 or 20. The only apparent requirement is that N be any positive, real, rational number. There is no need for $f$ and $Nf$ to be harmonically related. However, in practice, it may be convenient to obtain harmonics.

The expression $(Nf+a)$ serves as a sound basis for explanation. However, N will be a certain frequency conversion factor, and expressions such as $(Nf\pm a)$ read more generally and are applicable. The general explanation is that in any operating system there will be a first operating frequency, $f$, and a second operating frequency $f'$ differing substantially from $f$. For example, $f'$ may be one of $(Nf\pm a)$ mentioned above. The system will further include such frequency conversion circuits as to render the effective pair of sources of each of the two inputs to each phase angle indicating device to be like frequencies except for a difference which is the frequency of phasemeter input.

Station A of Figure 6 is similar to station A of Figure 5 except that the indicating equipment is now at separate station 120, and station A is provided with a modulator 122 and transmitter 124 for relaying from antenna 126 a relay frequency $f_{R3}$ distinct from the relay frequency $f_{R1}$ originating at station 14.

The transmitter 30' at station A corresponds to transmitter 30 of Figure 5 except that the related frequency is now $Nf$ where N may be the selected one of any of the aforesaid integral or fractional real, rational, positive numbers.

At recording station 120 relay transmission $f_{R1}$ is detected at receiver 54', relay transmission $f_{R2}$ is detected at receiver 102' and relay transmission $f_{R3}$ is detected at receiver 128. Phase measuring device 60', corresponding to device 60 in Figure 5, is connected between receivers 54' and 128. Phase measuring device 106', corresponding to device 106 in Figure 6, is connected between receivers 102' and 128.

It will be understood that when $Nf$ and $$\left(f+\frac{a}{N}\right)$$

are selected to be an inherent or natural by-product of a conventional transmitter, the design of a practical system is greatly simplified. In accordance with the principles of heterodyne phase comparison systems, the separate transmitters may drift with respect to one another, and errors will cancel out. However, in the present case the "N" relationship at each transmitter must be maintained by inherent or deliberate synchronization.

It will be understood that in all cases the relay links thus far described as radiation links may be solid conductor transmission links instead. It will also be understood that additional indicating stations may be added as desired, within the radiation field of the relay transmitters, and/or all within the reach of solid conductor links.

As a further embodiment of the invention, for the general case of Figure 6 as well as the more specific case of Figure 5, a phase indicating device 130 (Fig. 5, no equivalent shown in Fig. 5) may be connected across the outputs of receivers 54' and 102' to directly measure the phase angle between the frequencies $a$ there appearing. This phase measuring device will indicate elliptical lines of position having foci at stations A and B (Fig. 5) or A and B (Fig 6). This is of value because the elliptical lines will be orthogonal to the hyperbolas indicated by phase measuring device 106 or 106'. Such an arrangement provides 90° intersections between the two sets of lines of zero phase shift and therefore provides optimum accuracy in determining positional fixes.

The equivalent of device 114 of Figure 5 is not shown in Figure 6. However, such an arrangement may exist between phase measuring devices 60' and 106'.

A three-dimensional system may be formed by the addition of another relay station in the general case represented by Figure 6 or in any specific case, for example, that represented in Figure 5. A general case for such a three-dimensional system is shown in Figure 7. In addition to stations A, B, and C, an additional fixed relay station 140 is provided. This station includes radio frequency amplification, multiplication and detector circuits corresponding to those at station B and with modulator circuit 142 and transmitter 144 for radiating from antenna 146 a still further distinct relay frequency $f_{R4}$. The indicating station designated 150 may include among other components receivers 128, 54', 102' and 152, for respectively detecting frequencies $f_{R1}$, $f_{R2}$, $f_{R3}$ and $f_{R4}$. Phase measuring devices 60', 106' and 154 respectively indicate distance $R_c$ between stations C and A, distance $CB_1$—CA between stations C and 140 and distance $CB_1$—CA between stations C and B. Additional phase measuring devices can be added to incorporate the indications provided by phase measuring devices 114 and/or 130 of Figures 5 and 6 as desired.

Figure 8:
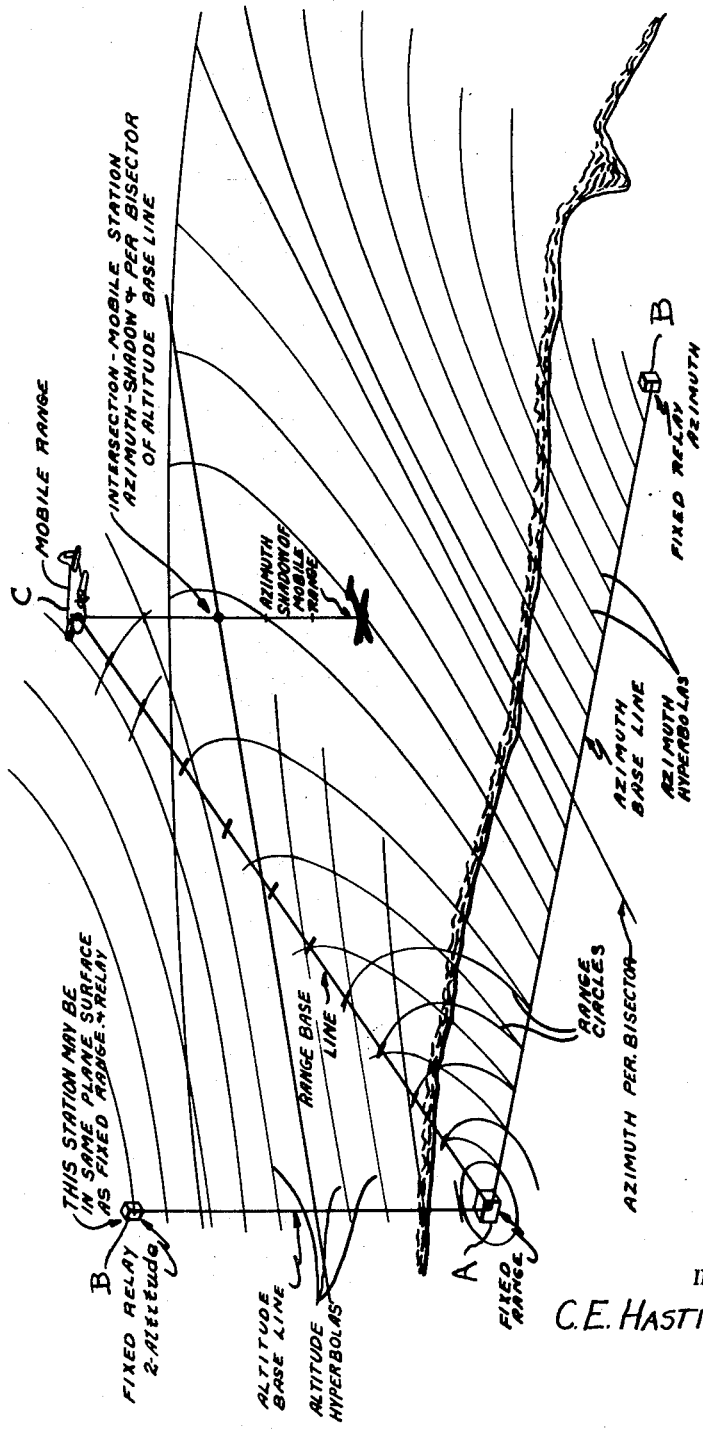
Figure 8 shows a circular-hyperbolic map of the system of Figure 7.

A representative three-dimensional system is mapped in Figure 8. It is to be understood that a three-dimensional system may have all stations in a plane surface, which may be horizontal. Although there are advantages to having an elevated relay station, it is perfectly feasible to determine a position in space with all the relay stations in a plane. With ranges from 3 points on a plane to a point in space, the problem is merely one of solving triangular pyramids.

A system of the type just described is extremely useful in three-dimensional work, inasmuch as it is impractical to use hyperbolic and elliptical overlays in space to determine a positional fix.

Figure 9:
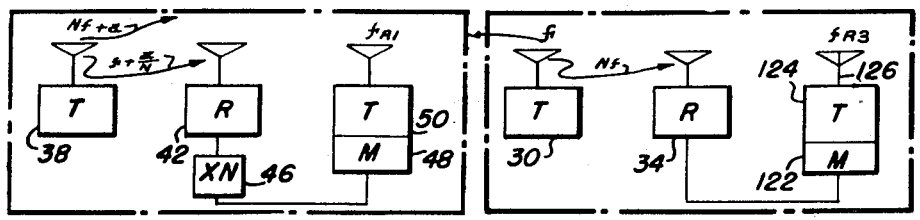
Figure 9 shows equipment according to the invention and particularly according to Figure 6 with the equipment of a mobile and fixed station transposed.

It is possible to interchange the equipment at stations C and A to provide the station A equipment on the mobile craft, and the station C equipment at the fixed range position. Such a system is illustrated in Figure 9, wherein the mobile station is designated C' and includes the equipment of stations A in Figures 5 and 6. The fixed range station is designated A' and includes the equipment of station C of Figures 5 and 6.

It has been hereinabove stated that that hyperbolic indication in terms of electrical angle should be multiplied by 2, or at least nearly so, to provide a direct indication of distance. The necessity of such multiplication may be understood by a consideration of the following: In a single dimension pure range system as described in the above mentioned Patent 2,709,253 the effective wavelength of the system is determined by the frequency generated at the mobile transmitter which is radiated to the opposite station. The phasemeter will indicate a 360° change of phase for each "lane" traversed. The width of a lane is one-half wavelength measured along a line extending between the stations. This is true of hyperbolic component of a system according to the present invention, if the predominant frequency of the mobile transmitter (the frequency transmitted to the other stations), is, for example, $Nf$ or $(Nf+a)$. However, if the predominant frequency of the mobile transmitter is $f$, the effective wavelength of the system is computed from means $f$. This is explained as follows: Referring to Figure 6, stations C and B may be regarded as the fixed relay stations for the hyperbolic component. (Or, consider also stations A' and C' where the equipment is reversed, as in Figure 9.) Referring to Figure 6 with stations C and B fixed to continue the example (which renders $f$ the predominant frequency of the "mobile" station), a heterodyne frequency $(a/N)$ is produced at station C. If this heterodyne were compared in phase with a similar heterodyne produced at relay station B, the effective wavelength of the system could be computed from frequency $f$. In this case, however, one heterodyne frequency is multiplied by N in the circuit 46 (station C). The other is produced by multiplying at station B the original frequency $f$ of the mobile transmitter by N before the heterodyning process. As a result of these multiplications, the rate of change of the phasemeter indication will be N times greater than if no multiplication had occurred. It is to be noted that if the predominant frequency of the mobile transmitter is $(Nf+a)$ such multiplication goes in the hyperbolic component of the system. In summary the effective wavelength of the hyperbolic component of the system will be based upon $Nf$ or $(Nf+a)$, but in no way upon $f$.

It will be understood that the value of $a$ is preferably small enough so that a set of frequencies, say $Nf$ and $(Nf+a)$, will be within a usual frequency band allocation. However, assuming availability of bands, no limitation is necessary and none is intended.

Where the circular and hyperbolic phasemeters indicate in electrical angles, these angles must be multiplied, as above stated, by some coefficient to obtain distance. In all cases the hyperbolic coefficient will always be approximately, and in some cases exactly, twice the range coefficient. This is so because in a range or circular system a 360° phase rotation will occur for each one-half wavelength that the range changes. In a hyperbolic system, the measured phase angle will change 360° for each change of the difference in distances to the two station foci of one full wavelength. Movement of the mobile transmitter one-half wavelength along the base line will cause the difference in distances to change one full wavelength, since one distance is increased by one-half wavelength and the other is decreased by one-half wavelength. Thus lines of equal phase difference will be separated by one-half wavelength along the base line, diverging away from the base line, but nevertheless, the difference, CA—CB must have changed one whole wavelength for each revolution of the phasemeter. As previously pointed out, the effective wavelength will be determined from $Nf$ or $(Nf+a)$, depending upon whether $f$ or $(Nf+a)$ is the predominant frequency of the mobile transmitter.

At least three possible situations may exist. They are:

1. The indicators are carried with the mobile unit. In this case, the effective wavelength for both range and hyperbolic systems will be identical. It will be computed from $Nf$ or $(Nf+a)$ depending on whether $f$ or $(Nf+a)$ is the predominant frequency of the mobile transmitter.

2. The indicators are located at the fixed range station. If the predominant frequency of the mobile transmitter is $f$, the effective wavelength of the hyperbolic system would be determined from $Nf$, but the effective wavelength of the range system would be computed from $(Nf+a)$. If $(Nf+a)$ is the predominant frequency of the mobile transmitter, just the reverse would occur.

3. The indicators are located at some place other than as in 1 or 2 above. Then as always, the effective wavelength of the hyperbolic system would be computed from $Nf$ or $(Nf+a)$ depending on whether $f$ or $(Nf+a)$ is the predominant frequency of the mobile transmitter. The effective frequency of the range system would depend on how the length of the relay link varies with variations in range. This is more complicated than in cases 1 and 2 above.

In case 1 above, the hyperbolic dial would need to be multiplied by a coefficient exactly twice the range coefficient. In cases 2 and 3, the hyperbolic coefficient would be only approximately twice, due to the difference in effective wavelengths. However, if $a$ is small, the approximation is very close.

It is inherent in the operation of continuous wave systems having station spacings greater than one-half wavelength that so-called lane ambiguity exists unless special measures are taken. (A lane represents a 360° rotation of a phase measuring device.) Lane ambiguity can be resolved by maintaining a continuous record of lanes crossed. This can be done conveniently by connecting a pen and ink recorder to the phase measuring device, as will be well understood by those skilled in the art. However, this method of resolving lane ambiguity fails if radio reception should be disrupted and in that period the mobile craft has moved an unknown distance.

A first lane identification system according to the present invention will be described with reference to Figure 10. In this case the mobile station is designated by reference character 210, range relay station by reference character 212 and relay station by reference character 214. It will be understood that in keeping with the general case, the equipment at the mobile station and the range relay station may be interchanged (see Figure 9).

Figure 10:
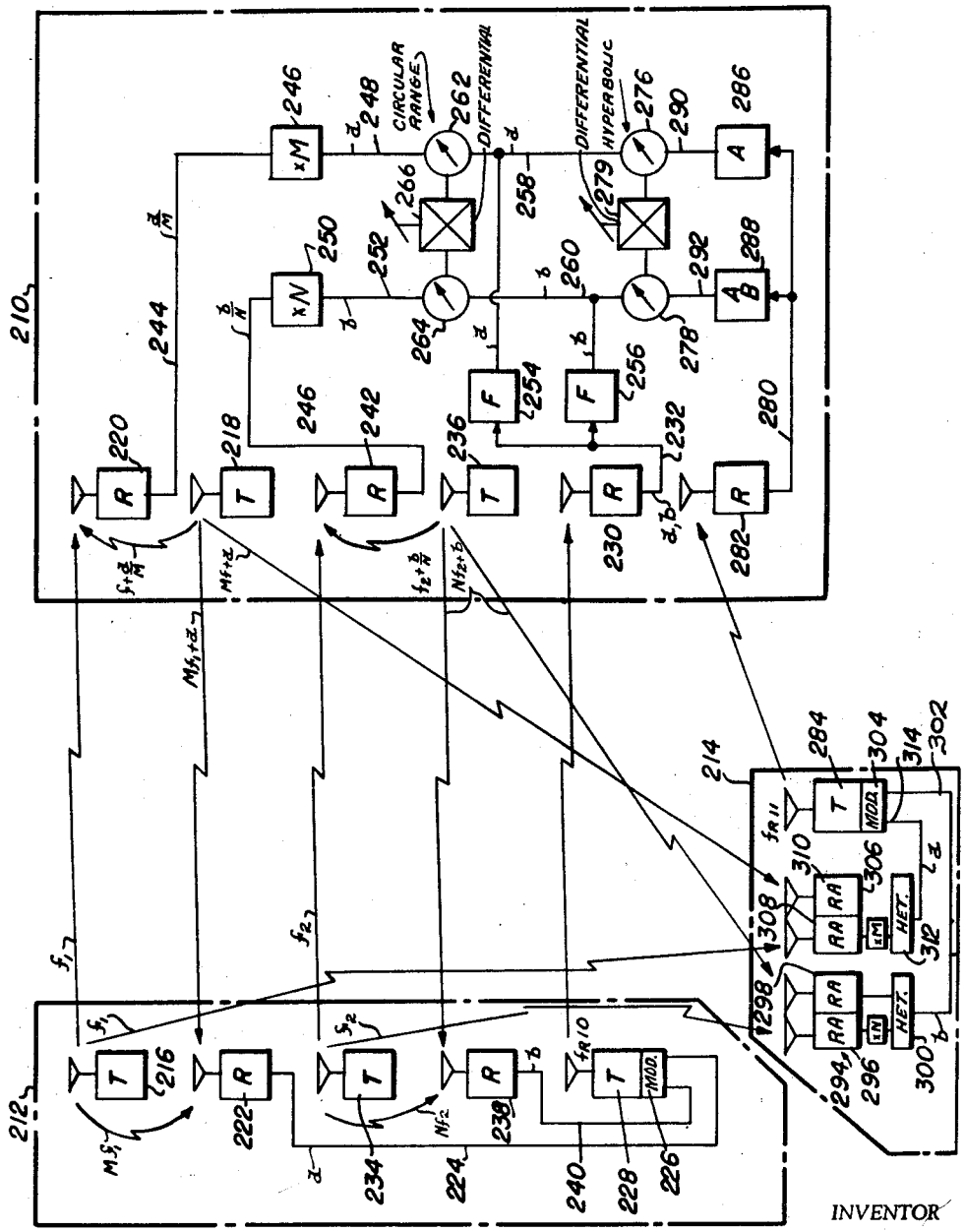
Figure 10 shows a first embodiment of a system for resolving lane ambiguities.

In Figure 10 a first radio navigation frequency $f_1$ is emitted by transmitter 216 at station 212 and a limited amount of a related frequency at $Mf_1$ is also radiated. M can be any real, rational, positive number. At station 210 transmitter 218 emits frequency $(Mf_1+a)$ and a limited amount of a sub-frequency $$\left(f_1+\frac{a}{M}\right)$$

The similarity between the just described equipment and that in previously described systems will be apparent. The transmissions $f_1$ and $$\left(f_1+\frac{a}{M}\right)$$

are detected by receiver 220 at station 210. The radiations $Mf_1$ and $(Mf_1+a)$ are detected by receiver 222 at station 212. At station 212 the heterodyne or beat frequency $a$ detected at receiver 222 is transmitted over line 224 to modulator circuit 226, which modulates a relay carrier frequency $f_{R10}$ emitted by relay transmitter 228. Frequency $f_{R10}$ is detected by relay receiver 230 at station 210 and beat frequency $a$ is available on output line 232.

Station 212 also includes navigation transmitter 234 which generates radio frequency $f_2$ and a limited amount of a related frequency $Nf_2$. Station 210 includes navigation transmitter 236 which generates a frequency $(Nf_2+b)$ and a limited amount of a subfrequency $$\left(f_2+\frac{b}{N}\right)$$

Station 212 includes navigation receiver 238 whereat the emissions $Nf_2$ and $(Nf_2+b)$ are detected, producing beat note $b$ on output line 240. Line 240 is connected as another input to modulator 226. Therefore, the carrier frequency $f_{R10}$ emitted from transmitter 228 includes as a modulation component the beat frequency $b$ as well as the previously mentioned beat frequency $a$. As a consequence, the output of receiver 230 on line 232 at station 210 also carries beat frequency $b$.

Station 210 also includes navigation receiver 242 which receives the radiations $f_2$ and $$\left(f_2+\frac{b}{N}\right)$$

It will now be apparent that there exist two basic range systems each operating at a distinct set of radio frequencies, but sharing one return relay link at carrier frequency $f_{R10}$.

In Figure 10, it will be apparent that line 244 serving as an output of receiver 220 carries a beat frequency $a/M$. Similarly line 246 serving as an output of receiver 242 carries beat frequency $b/N$. The beat frequency $a/M$ on line 244 is multiplied by factor M in multiplier circuit 247 and appears as beat frequency $a$ on line 248. Beat frequency $b/N$ on line 246 is multiplied in circuit 250 by the factor N and appears on line 252 as beat frequency $b$.

The combined beat frequencies $a$ and $b$ on line 232 are presented to band pass filters 254 and 256. Filter 254 is designated to pass only the beat frequency $a$, and the filter 256 to pass only the beat frequency $b$. The outputs of filters 254 and 256 are connected to lines 258 and 260 respectively so that the beat frequency $a$ appears on line 258 and the beat frequency $b$ on line 260.

Figure 11:
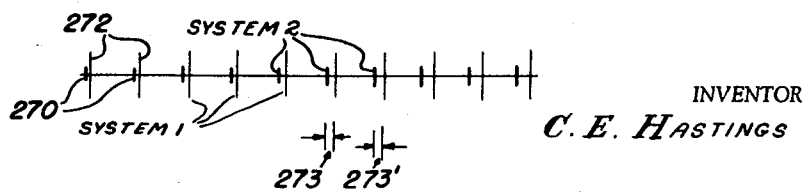
Figure 11 shows diagrammatically the basis for lane ambiguity resolution based upon a vernier principle.

A phase measuring device 262 is provided for indicating range based on the beat frequency $a$ and a phase measuring device 264 provided for indicating range based on beat frequency $b$. Phase measuring device 262 has one input connected to line 248 and the other to line 258. Phase measuring device 264 has one input connected to line 252 and the other input to line 260. Either of the phase measuring devices 262 or 264 is capable of giving a "fine" range reading. It is simply necessary for the operator to decide which of the frequencies $f_1$ or $f_2$ is to serve as the basis of the circular system. A differential device 266, which may be mechanical or electronic, may be connected between the phase measuring devices 262 and 264. This device per se may correspond to the differential device 114 shown in Figure 5. However, in the present case the device 266 serves as an absolute lane identification device. It does so when frequencies $f_1$ and $f_2$, while distinct, are nevertheless fairly close together, as in the ratio of 9 to 10. Since the two superimposed systems operating on the $f_1$ and $f_2$ frequencies have such ratio, at any given instant the differential device 266 will show the precise lane, on a vernier principle. That is, as shown in Figure 11, if lines 270 show one-half wavelength spacings represented by frequency $f_1$ and lines 272 show one-half wavelength spacings for frequency $f_2$, for every lane position there is a differential 273, 273', etc., of different value.

Continuing to refer to Figure 10, a phase measuring device 276 is provided for indicating hyperbolic position based on beat frequency $a$, and phase measuring device 278 is provided for indicating hyberbolic position based on beat frequency $b$. The beat frequencies $a$ and $b$ are available on line 280 leading from relay receiver 282. Receiver 282 receives transmissions from relay transmitter 284 at relay station 214. The beat frequencies $a$ and $b$ on line 280 are amplified respectively in amplifier circuits 286 and 288 at station 210 and thereafter the beat notes are supplied to phasemeters 276 and 278 over lines 290 and 292 respectively. The second inputs of hyperbolic phase measuring devices 276 and 278 are connected to lines 258 and 260 respectively. A differential device 279 may be provided to indicate the lane information for the hyperbolic system, as does device 266 for the circular or range systems.

The relay station 214 includes receiver 294 having a first section 296 for amplifying received signals at frequency $f_2$ and a second section 298 for amplifying signals at frequency $(Nf_2+b)$. Frequency $f_2$ is multiplied by N and the signals are detected in detector section 300 and beat frequency $b$ is available on output line 302. Line 302 serves as one input to modulator circuit 304 and modulating beat frequency $b$ onto a radio carrier frequency $f_{R11}$, which is the frequency received by receiver 282 at station 210.

Relay station 214 also includes receiver 306 having a first section 308 for amplifying received signals at frequency $f_1$ and a second section 310 for amplifying received signals at frequency $(Mf_1+a)$. The amplified signal $f_1$ is multiplied by M and the signals are detected in detector section 312 and beat frequency $a$ is available on output line 314. Line 314 is also connected as an input to modulator circuit 304 and thus the relay frequency $f_{R11}$ also includes beat frequency $a$ as a modulation component. Accordingly, both beat frequencies $a$ and $b$ are available on line 280 at the output circuit of receiver 282 as previously described.

It will be noted that the system of Figure 10 requires four basic navigation frequencies $f_1$, $Mf_1$, $f_2$ and $Nf_2$, as well as relay frequencies $f_{R10}$ and $f_{R11}$. It will be understood that with the indicating equipment at various locations, the requirement for relay frequencies may be different.

Figure 12:
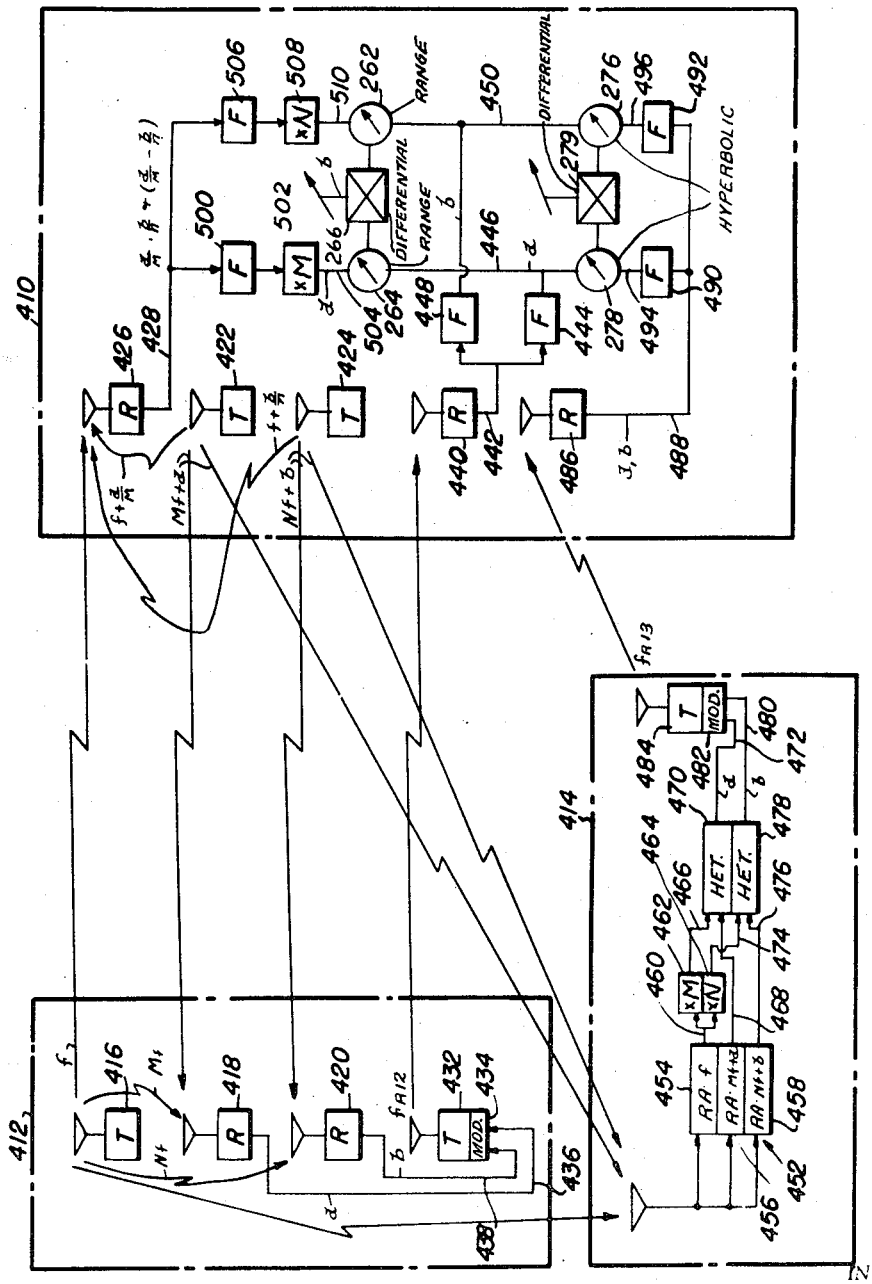
Figure 12 shows another embodiment of system for resolving lane ambiguities.

In Figure 12, a system similar to that in Figure 10 is illustrated, but wherein the number of required frequencies is reduced. According to the system now to be explained, only three basic navigation frequencies are required, $f$, $(Mf+a)$ and $(Nf+b)$, together with relay frequencies as dictated by the location of the indicating equipment. Thus, there is at least one less frequency required as compared to the system of Figure 10. Nevertheless, the system of Figure 12 provides positive lane identification.

In Figure 12, the mobile station is designated 410, the fixed range station 412 and the fixed relay station 414. Range station 412 includes transmitter 416 at frequency $f$ with limited emission at $Mf$, and receiver 418 for detecting frequency $Mf$. Transmitter 416 also emits a limited amount of frequency $Nf$ and station 412 includes receiver 420 for detecting this frequency.

Station 410 includes transmitter 422 emitting frequency $(Mf+a)$ and also includes transmitter 424 emitting frequency $(Nf+b)$. These transmitters also radiate $$\left(f+\frac{a}{M}\right) \text{ and } \left(f+\frac{b}{N}\right)$$

respectively. Receiver 426 at station 410 receives frequencies $$f, \left(f+\frac{a}{M}\right) \text{ and } \left(f+\frac{b}{N}\right)$$

Beat frequencies on output line 428 include $$\frac{a}{M}, \frac{b}{N} \text{ and } \left(\frac{a}{M}-\frac{b}{N}\right)$$

Phase measuring devices are provided in accordance with the system shown in Figure 10 and are, therefore, similarly designated as 262, 264, 276 and 278. There may be connected between devices 262 and 264 the differential device 266 and between devices 276 and 278 the differential device 279.

Station 412 includes relay transmitter 432 operating at relay frequency $f_{R12}$ and connected to modulation circuit 434. Modulation circuit 434 receives beat frequency $a$ over line 436 which is an output of receiver 418 which heterodynes received frequencies $Mf$ and $(Mf+a)$. Modulation circuit 434 also receives over line 438 from receiver 420 beat frequency $b$ derived from received signals $Nf$ and $(Nf+b)$. Thus, both beat frequencies $a$ and $b$ are modulation components of relay frequency $f_{R12}$.

Relay frequency $f_{R12}$ is received at station 410 by receiver 440 and beat frequencies $a$ and $b$ are available on line 442 at the output thereof. Beat frequency $a$ is passed by filter 444 and supplied to line 446. Beat frequency $b$ is passed by filter 448 and is supplied to line 450.

Relay station 414 includes radio amplification circuits designated generally as 452 and including a first section 454 for amplifying frequency $f$, second section 456 for amplifying frequency $(Mf+a)$ and third section 458 for amplifying frequency $(Nf+b)$. The output of section 454 appears on line 460 and is multiplied by the factor M in multiplier circuit 462 and multiplied by the factor N in multiplier circuit 464. The frequency $Mf$ on line 466 and the frequency $(Mf+a)$ on line 468 are supplied to detector circuit 470, wherein beat frequency $a$ is detected and made available on output line 472. Frequency $Nf$ on line 474 and frequency $(Nf+b)$ on line 476 are supplied to detector 478 and the beat frequency $b$ is available on output line 480. Lines 472 and 480 are connected to modulation circuit 482 which modulates relay frequency $f_{R13}$ generated in transmitter 484.

Relay frequency $f_{R13}$ is received at station 410 by receiver 486 and the beat frequency $a$ and $b$ are made available on output line 488. Beat frequency $a$ is passed by filter 490 and beat frequency $b$ is passed by filter 492, beat frequency $a$ being available on output line 494 and beat frequency $b$ being available on output line 496.

The beat frequency $(a/M)$ on line 428 at station 410 is passed by filter 500 and multiplied by M at multiplier circuit 502 to provide beat frequency $a$ on output line 504. The beat frequency $(b/N)$ on line 428 is passed by filter 506 and multiplied by N at multiplier circuit 508, resulting in beat frequency $b$ being available on output line 510.

Range phase device 262 is connected between lines 450 and 510 and therefore provides range or circular indication based on beat frequency $b$. Range phase device 264 is connected by the lines 446 and 504 and therefore provides range indication based on beat frequency $a$. The range data may be based upon frequency $Mf$ or frequency $Nf$. Whichever is selected, the differential device 266 will provide means of positive lane identification, according to the vernier principle diagrammed in Figure 11, $Nf$ and $Mf$ being in a ratio such as 9:10.

Hyperbolic phase device 276 is connected between lines 450 and 496 and therefore provides hyperbolic indication based on beat frequency $b$. Hyperbolic phase device 278 is connected between lines 446 and 494 and therefore provides hyperbolic indication on beat frequency $a$. The radio frequencies upon which the hyperbolic systems are based will depend upon whether stations 410 and 412 are mobile and stationary, respectively, or vice versa, all as discussed hereinabove in connection with Figure 9. Whatever the case, the differential device 279 will provide a positive hyperbolic lane identification, based on the vernier principle described in connection with Figure 11.

In all of the foregoing embodiments, and in the general case, it will be understood that the frequency by which radio frequencies differ in the same channel will be normally fairly small. That is, for $(Nf+a)$, where $Nf$ is 2000 kc., $a$ may be 1000 c.p.s. or less. However, no limitation is intended, so long as the lower frequencies are such as to permit the required heterodyning action to occur.

Wherever transmitting equipment or receiving equipment is described as radiating or receiving radio waves, it will be understood that such equipment may share antenna structure as well as use separate structures within the knowledge of the art.

Wherever stations are referred to, accuracy of location thereof is determined by the position of antenna structure, inasmuch as signal travel over diverse paths originates and terminates at such structure.

Wherever it is possible that receivers produce heterodyne frequencies other than those specifically mentioned hereinabove such frequencies may be suppressed by any convenient means if their presence would cause the equipment to operate other than as described.

It will be understood that in all cases the relaying of the heterodyne frequencies may be by single or multiple frequency or amplitude modulation onto relay radio carriers, or in fact, as amplitude modulations onto one or more of the positional radio carriers. Relaying by solid conductor means is also included in every case.

At station B in Figures 5, 6 and 7, and at station 140 in Figure 7, there is employed circuitry for separately amplifying two radio frequencies, say $f$ and $Nf+a$, multiplying the output of the $f$ amplifier by a factor $N$, and detecting a beat frequency therebetween. While those skilled in the art will have no difficulty constructing a suitable circuit, a preferred embodiment is shown in Figure 13.

In Figure 13, it may be assumed that two frequencies $f$ and $(Nf+a)$ generate corresponding voltages in antenna structure 550. For purposes of explanation it may be assumed that frequency $f$ is equal to 2402.5 kc., $N$ equals 2 and $a$ equals 400 c.p.s.

Radio frequency amplifier 552 is provided for amplifying 2402.5 kc. which is next applied to a mixer circuit 554 which is also provided with frequency 2630.5 kc. from an oscillator circuit 556. Mixing in circuit 554 provides an intermediate frequency of 228 kc. on line 558, which is amplified in intermediate frequency amplifier 560 and thereafter applied to doubler circuit 562. The output of circuit 562 is on line 564, at 456 kc. An automatic volume control circuit is preferably provided and in Figure 13 is designated 566, being connected to the output of the intermediate frequency amplifier 560. The volume control potential is returned over line 568 to each of the circuits 552, 554 and 560.

A radio frequency amplifier circuit 570 is provided for amplifying received frequency 5805.4 kc. A mixer circuit 572, intermediate frequency amplifier circuit 574 and an automatic volume control circuit 576 are provided to correspond to the components in the channel of radio frequency amplifier 552. Mixer circuit 572 has applied thereto over line 578 a mixing frequency at 5261 kc. derived from a doubler circuit 580 energized from the previously mentioned oscillator circuit 556. Thus, the output of mixer circuit 572 on line 582 is 456.41 kc., which is amplified in circuit 574. The frequency 456.4 kc. from circuit 574 and the frequency 456 kc. on line 564 are mixed in an additional mixer circuit 584 and the mixed signals appear on line 586. These signals are applied to a detecting and amplifying circuit 588, and the resulting heterodyne signal 400 c.p.s. (frequency $a$) is available on output line 590.

According to a further embodiment of the generic invention of this application, some difficulties incident to conversion of the heterodyne frequencies (which are usually and preferably in the audio range) of the system embodiment described hereinabove are avoided by the conversion, instead, of the higher, usually radio frequencies.

Figure 14:
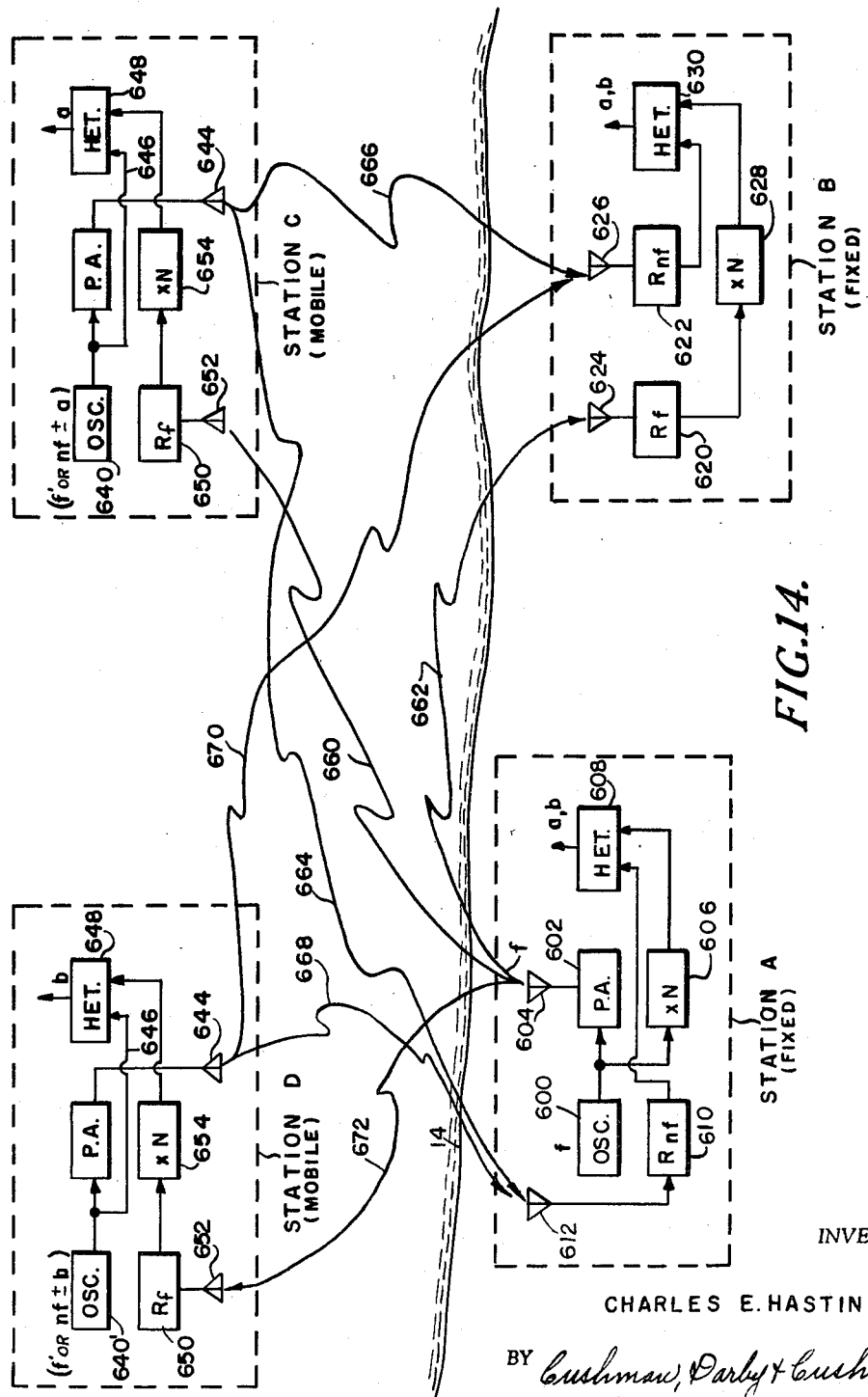
Figure 14 shows equipment for a further embodiment of a system according to the invention.
Figure 15:
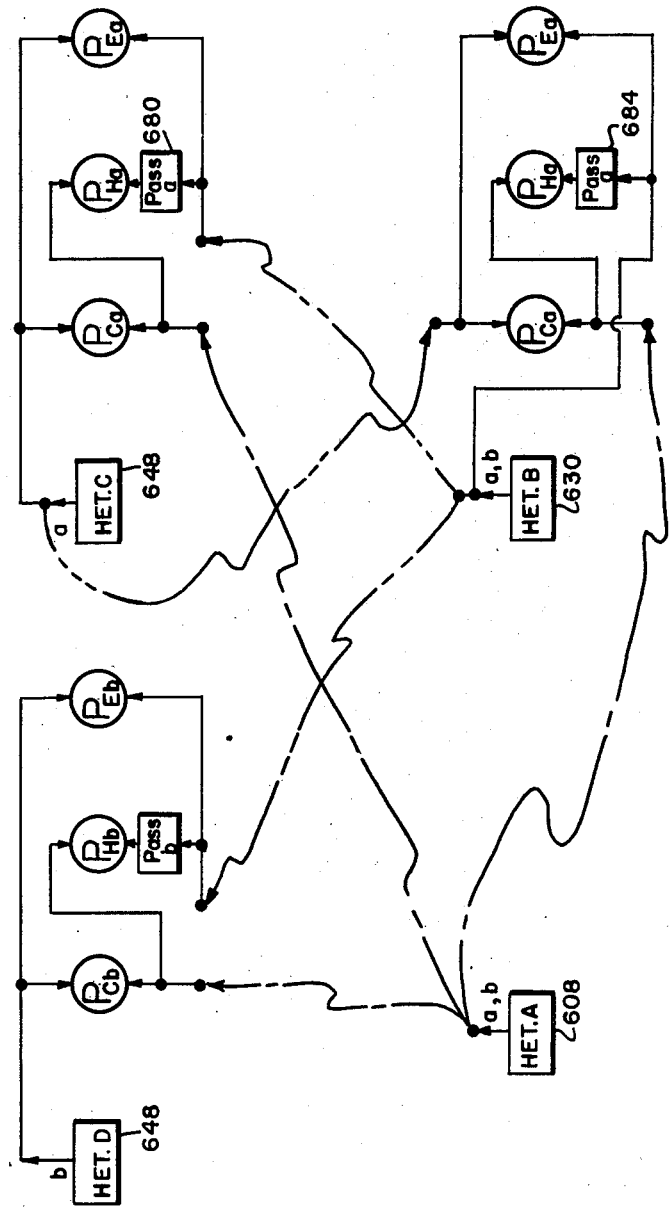
Figure 15 shows further equipment for the system of Figure 14.

In Figure 14 a layout of stations A, B, C and D will be observed in the same sense as the layout of these stations in Figures 1, 2, 3 and 4. In Figure 14 equipment for each station is shown up to and including a heterodyne means and an output line therefrom which carries certain desired heterodyne or beat frequencies. To avoid confusion in one figure, Figure 14 is supplemented by Figure 15. The latter figure takes up at the heterodyne circuits, where Figure 14 leaves off, and diagrammatically shows equipment for relaying of heterodyne frequencies and detection of phase angles therebetween. In Figure 15 an attempt is made to show several of the possible arrays of heterodyne frequency phase angle indicating instruments (phasemeters) for creating the systems of Figures 1, 2 and 3. While it is not contemplated that any one system in use will employ all of the illustrated phasemeters at all stations, Figure 15 serves to show what can be accomplished, and the user can omit phasemeters as desired.

Referring to Figure 14, station A includes an oscillator 600 feeding energy through a power amplifier 602 to radiating antenna 604. Part of the oscillator energy is applied to a frequency conversion circuit 606 for converting by a factor $N$. $N$ may be any real, rational, positive number. If the frequency of the oscillator which is radiated is $f$, say 1,000 kilocycles per second (kc.p.s. or kc.) and $N$ is 2, the frequency on the output from circuit 606 would be 2,000 kc. This output is applied as one input to a heterodyne circuit 608.

Station A further includes a radio circuit 610. The input thereto is from receiving antenna 612 and the output to the heterodyne circuit 608. Circuit 610 is tuned to pass or amplify radio frequencies around $Nf$ and discriminate against at least frequency $f$ and neighboring frequencies.

Station B includes a first radio circuit 620 tuned to pass or amplify frequency $f$, but not $Nf$. The station further includes radio circuit 622 tuned to pass or amplify frequency $(Nf+a)$, but not frequency $f$. Circuit 620 has antenna 624 connected as an input, and antenna 626 serves circuit 622. A frequency conversion circuit 628 for converting by factor $N$ is connected with the output of circuit 620. The output of this conversion circuit is applied as one input to a heterodyne circuit 630, the other input of which is connected to the output of radio circuit 622.

Station C includes an oscillator 640 operating at a frequency which can be described as $(Nf+a)$, where $N$ is the conversion factor of circuits 606 and 628. Preferably $a$ amounts to around 1,000 c.p.s. Taking $a$ as 800 c.p.s. as an example, and taking $f$ as 1,000 kc. and $N$ as 2, $(Nf+a)$ would be 2,000.8 kc. One can also think in terms of $(Nf\pm a)$, and with the above examples, $(Nf-a)$ would be 1,999.2 kc. The frequency of oscillator 640 is to be such that after conversion of $f$ by $N$ there still will be a difference $a$ from $Nf$. $f$ and $(Nf\pm a)$ need not be harmonically related. Part of the signal from oscillator 640 is passed through power amplification circuit 642 as may be desired and radiated from antenna 644. Another part of the oscillator energy is applied over line 646 to a heterodyne circuit 648. Station C further includes a radio amplification circuit 650 tuned to pass or amplify signals at frequency $f$ (but not $Nf$) intercepted by antenna 652. The output of circuit 650 is applied to a frequency conversion circuit 654 for converting by factor $N$. The output of circuit 654 is applied as a second input to heterodyne circuit 648.

Station D is the same as station C except that the oscillator, here designated 640', operates at a frequency $(Nf\pm b)$ where $b$ would be sufficiently distinct from the amount $a$ of oscillator 640 as to be separable in suitable filtering or bandpass circuits. Amount $b$ could be 400 c.p.s., where $a$ is 800 c.p.s.

It is within the contemplation of the invention that the number of mobile stations can be expanded beyond the two stations C and D shown in Figure 14. That is, by providing each additional mobile station with an oscillator at $(Nf\pm c)$, $(Nf\pm d)$, etc., the system of the shore stations A and B can be utilized by a great number of mobile craft simultaneously. This is particularly true under certain circumstances as will be more fully explained hereinbelow.

To now explain the operation of a basic system such as made up of stations A, B and C, or A, B and D, the following functions are to be noted. Considering the system of stations A, B and C as exemplary, frequency $f$ will be radiated from antenna 604 to antenna 652 (station C) as symbolized by arrow 660. Similarly, frequency $f$ is radiated from antenna 604 to antenna 624 (station B) as indicated by arrow 662. Concurrently, frequency $(Nf+a)$ will be radiated from antenna 644 (station C) to antenna 612 (station A) per arrow 664, and also to antenna 626 (station B) per arrow 666.

Concurrently, frequency $(Nf+b)$ will be radiated from antenna 644 (station D) to antenna 612 (station A) per arrow 668, and to antenna 626 (station B) per arrow 670.

At this point it may be mentioned that separate antennae at each station are not required and equipment can share the same antenna structure. However, separate antennae for transmitting and receiving are illustrated for the sake of clarity in the drawings.

It is also to be noted that frequency $f$ from antenna 604 (station A) proceeds to antenna 652 of station D, per arrow 672.

It is not intended to imply that radiations are to be directive. On the contrary, all antennae may intercept all of the radiations. The arrows in the drawings are simply to facilitate understanding of the intended operation.

For the purpose of suitable terminology in hereinafter appended claims, stations A, B and C, as an exemplary system, can be otherwise described as made up of a first station, a second station and a third station, respectively.

It will be appreciated that station A can be movable, and C fixed, if desired.

With energy at frequencies $f$, $(Nf \pm a)$ and $(Nf \pm b)$ radiated and intercepted as explained above it will be observed that at station A the output of heterodyne circuit 608 will include frequencies $a$ and $b$, and the same at circuit 630 of station B. The output of heterodyne circuit 648 at station C will be only the heterodyne frequency $a$. The output of heterodyne circuit 648 at station C will be only the heterodyne frequency $a$. The output of heterodyne circuit 648 at station D will be the frequency $b$.

The expression $(Nf+a)$ serves as a sound basis for explanation. However, N will be a certain frequency conversion factor, and expressions such as $(Nf \pm a)$ read more generally and are applicable. The general explanation is that in any operating system there will be a first operating frequency, $f$, and a second operating frequency $f'$ differing substantially from $f$. For example, $f'$ may be one of $(Nf \pm a)$ mentioned above. The system will further include such frequency conversion circuits as to render the input frequencies to the heterodyne means equal except the selected heterodyne frequency.

Turning to Figure 15, the heterodyne circuits of each station of Figure 14 are illustrated in comparable position. Let it be first assumed that phasemeters are to be carried upon each mobile craft. With reference to station C, the three involved phase angle indicating instruments are shown. For the range or circular system between stations A and C, it is meter $P_{Ca}$. For the hyperbolic system with stations A and B as foci it is $P_{Ha}$. For the elliptical system with stations A and B as foci the meter is $P_{Ea}$. A similar arrangement is shown for the additional exemplary mobile station D, the circular or range meter being $P_{Cb}$, the hyperbolic meter $P_{Hb}$ and the elliptical meter $P_{Eb}$.

Continuing to refer to Figure 15, if it should be desired to have indicating instruments at one or both of the fixed stations A or B, such can be accomplished. In fact, any number of indicating instruments at any position can be employed. Where the frequencies $a$ and $b$ are small compared to $f$ and $Nf$, phase shifts incident to relaying $a$ and $b$ become negligible and the placement of the indicating instruments is not critical. Furthermore, for any particular location of indicating instruments the phase shifts incident to relaying of frequencies $a$ or $b$ can be computed and accounted for. There is illustrated in Figure 15 at station $P_{Ca}$, $P_{Ha}$ and $P_{Ea}$, duplicating similar meters at station C. An additional set of meters $P_{Cb}$, $P_{Hb}$ and $P_{Eb}$ could be provided at station B, but are not shown in order to reduce the complexity of the drawing. A similar array of meters could be at station A, although same are not shown. It is believed that a sufficient array of indicating meters has been given in Figure 15 to render a full understanding of the possible expansion of the system.

Taking the case where indicating instruments are desired on the mobile craft and allowing stations A, B and C to be a representative system, for a combination circular-elliptical system it is to be noted that the sole output frequency $a$ from heterodyne circuit 648 of station C is applied as one input to meters $P_{Ca}$ and $P_{Ea}$. The freedom of contamination by other heterodyne frequencies $b$, $c$, $d$, etc. is to be particularly noted. Freedom from many other spurious signals is also avoided. Moreover, it is to be realized that there is no requirement for relaying the note $a$ in this case, so as to have same possibly contaminated due to relaying techniques. The second input to meter $P_{Ca}$ must be relayed from heterodyne circuit 608 of station A. While circuit 608 produces frequencies $a$ and $b$, it has been found that particularly where a phase angle detecting instrument in accordance with copending application of Rounion and Kolderup, Serial No. 586,517, filed May 22, 1956, for Phase Angle Measuring Apparatus, assigned to the assignee of the present invention is employed, there is no need to attempt to filter out frequency $b$ from $P_{Ca}$ inasmuch as the said indicating device will itself reject frequency $b$ and provide angle measurement only between the frequencies $a$ at the respective inputs. The frequencies from heterodyne circuit 630 of station B must be relayed so as to be applied as the second input of $P_{Ea}$ at station C. It is, of course, to be realized that the respective relay links from stations A and B to station C must permit of distinction. That is, the system cannot operate if $P_{Ca}$ receives heterodyne frequency $a$ from station B, nor can $P_{Ea}$ operate if it receives heterodyne frequency $a$ from station A. The usual practice is to have distinct radio carrier relay frequencies—these also distinct from frequencies $f$, $(Nf \pm a)$, $(Nf \pm b)$, etc. Frequency modulation techniques can be employed for conveying the heterodyne frequencies via the just mentioned relay carrier frequencies.

Operation of the hyperbolic meter $P_{Ha}$ at station C (like meter $P_{Hb}$ at station D) is dependent upon having inputs from stations A and B, respectively. In this situation there must be at least one filtering circuit 680 (station C, Fig. 15) for rejecting heterodyne frequency $b$. To the extent that such use of a filter circuit is involved, it is apparent that a circular-hyperbolic or elliptical-hyperbolic system is perhaps not as desirable as a circular-elliptical system, the latter having the benefit of only a pure beat frequency such as $a$ at station C applied to one side of the meter $P_{Ra}$ and $P_{Ea}$.

For the hyperbolic indication at station D, at least one filter circuit 682 must be used, here to reject heterodyne frequency $a$.

If it is desired to locate the indicating instrument other than on a mobile craft, some modification of the relay situation is required. Take, for example, the indicating meters $P_{Ca}$, $P_{Ha}$ and $P_{Ea}$ adjacent station B in Figure 15. Here again, a filter circuit 684 must be employed to reject heterodyne frequency $b$. However, while multiple frequencies are applied to one side of $P_{Ha}$, $P_{Ca}$ and $P_{Ea}$ only a pure, although relayed, heterodyne frequency is applied to the second inputs of $P_{Ca}$ and $P_{Ea}$. While some contamination of these frequencies due to relaying techniques involved may have to be met, nevertheless the situation is substantially identical to the pure frequencies applied to $P_{Ca}$ and $P_{Ea}$ as at station C.

Referring again to Figure 14, it should be understood that various inversions and alterations are possible. For example, the frequency conversion circuit 654 at stations C and D could be removed from between the radio circuits 650 and heterodyne circuit 648 and instead placed in the line 646 between oscillators 640 (640') and heterodyne circuit 648. However, the conversion circuit would convert as the reciprocal, or $1/N$. In this case, the conversion circuit 606 of station A could be removed into the link between radio circuit 610 and heterodyne circuit 608 and be of reciprocal, or $1/N$ type. Concurrently, the conversion circuit 628 of station B could be changed into the link between radio circuit 622 and heterodyne circuit 603, and again be the reciprocal. If such changes were to be made, the system as viewed from the phasemeters would be basically operating upon frequency $f$ rather than frequency $(Nf\pm a)$. Stated otherwise, the system shown in Figures 14 and 15 will operate so that if station C moves directly toward station A a distance equal to one-half the wavelength of $(Nf\pm a)$ meter $P_{Ca}$ will undergo a 360° revolution. This is to be contrasted to movement of station C directly toward station A one-half the wavelength of frequency $f$, which would not produce a 360° rotation.

In the general case there may be frequency conversion in both of the input channels to the heterodyne circuits, to bring the signals on these inputs to like amount except for a difference $a$, $b$, etc. Determination of the wavelength upon which to interpret the phasemeter readings depends upon the apparent frequency of the transmitter oscillators as viewed from the heterodyne inputs. Say oscillator 600 (station A) operates at 2,000.0 kc. and oscillator 640 (station C) at 3,000.2 kc. Suppose conversion circuits 606 (station A) and 654 (station C) multiply by 3. Suppose there are conversion circuits (not shown) multiplying by 2 in (1) the path between circuit 610 (station A) and (2) the path 646 (station C). The inputs to heterodyne circuits 608 (station A) and 648 (station C) will be 6,000.0 and 6,000.4 kc. With meters at station C the meter of reading will be based upon 6,000.4 kc.

From the foregoing it will be observed that the species of the invention utilizing principles of conversion of the heterodyne frequencies, or the systems converting the radio frequencies before heterodyning, are commonly characterized by at least first, second and third stations with transmitting means at the first station to operate at a frequency $f$ and at the third station at a frequency $N$ times $f$ plus or minus another amount, $a$, and further characterized by receiving means and heterodyne means associated therewith at the stations and responsive to transmissions from both transmitting means for producing heterodyne signals. The systems further include at least two phase angle measuring means, one for measuring the electrical angle between heterodyne frequencies produced at one pair of the stations and the other for measuring between heterodyne signals produced at another pair of the stations. The systems further include whatever means may be required for conveying or relaying the heterodyne signals to the place whereat indication as to the angle measurement and perhaps indication is to be accomplished.

It will be apparent that the principles of the system embodiment of Figures 14 and 15 also can be embodied into systems operating essentially two systems on spaced apart sets of frequencies so as to resolve lane ambiguities. Similarly, the embodiment of Figures 14 and 15 can be three-dimensional.

Some users may be interested in computation which may be made to show the effect of delays in relaying the heterodyne frequencies, etc.

Figure 16:
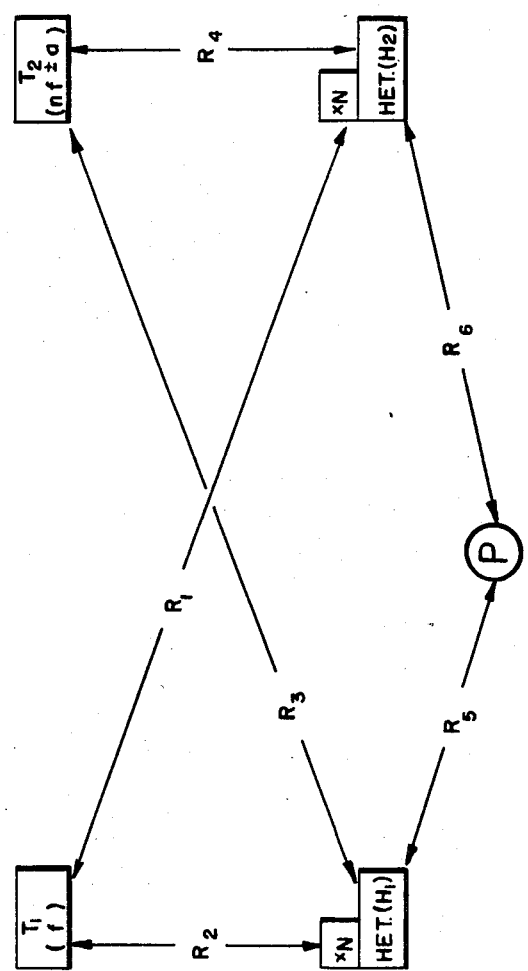
Figure 16 shows the components of a heterodyne phase comparison unit with distances between each component indicated for development of calculations.

Referring to Figure 16, let the rotations of phasemeters P be represented by X. Then, using $f$ and $(Nf+a)$, it can be developed that:

$$X=Nf\left(\frac{R_1}{c_1}+\frac{R_3}{c_3}-\frac{R_2}{c_2}-\frac{R_4}{c_4}\right)+a\left(\frac{R_3}{c_3}-\frac{R_4}{c_4}+\frac{R_5}{c_5}-\frac{R_6}{c_6}\right) \quad (1)$$

wherein:
$R_1$ is the distance from source of $f$ to $H_2$.
$R_2$ is the distance from source of $f$ to $H_1$.
$R_3$ is the distance from source of $(Nf+a)$ to $H_1$.
$R_4$ is the distance from source of $(Nf+a)$ to $H_2$.
$R_5$ is the distance from $H_1$ to P.
$R_6$ is the distance from $H_2$ to P.
$C_1$ is the rate of propagation over distance $R_1$.
$C_2$ is the rate of propagation over distance $R_2$.
$C_3$ is the rate of propagation over distance $R_3$.
$C_4$ is the rate of propagation over distance $R_4$.
$C_5$ is the rate of propagation over distance $R_5$.
$C_6$ is the rate of propagation over distance $R_6$.

The $c$'s for extreme accuracy must be given values according to the medium of propagation, etc. However, very little error is possible by assigning an average value $c_i$.

For the case of the circular system of Stations A and C with P located at Station C with the source of $(Nf+a)$ and $H_2$, whereby $R_2=R_4=R_6=0$ and $R_3$ and $R_5=R_1$, expression (1) reduces to:

$$X=\frac{Nf}{c_i}(2R_1)+\frac{a}{c_i}(2R_1)$$

or $$X=\frac{2R_1}{c_i}(Nf+a) \quad (2)$$

Expression (2) shows that $a$ in $(Nf+a)$ is a factor where P is located with the source of $(Nf+a)$. However, if P is with $H_1$ and the source of $f$ at Station A, then $R_2=R_4=R_5=0$ and $R_1=R_3=R_6$. The expression is then:

$$X=\frac{Nf}{c_i}(2R_1)+a(0)=\frac{Nf2R_1}{c_i} \quad (3)$$

and $a$ in $(Nf+a)$ is not a factor.

Similar expressions can be developed from expression (1) for hyperbolic and elliptical units.

For an elliptical unit with P and $H_2$ and the source of $(Nf+a)$:

$$X=\frac{Nf}{c_i}(R_1+R_3-R_2)+\frac{a}{c_i}(2R_3) \quad (4)$$

For a hyperbolic unit with P and the source of $(Nf+a)$ together, $T_1$ and $H_1$ together, whereby $R_2=0$, and $R_1$ is the distance between Stations A and B $$X=\frac{Nf}{c_i}(R_1+R_3-R_4)+\frac{a}{c_i}(R_3-R_4+R_5-R_6) \quad (5)$$

It has been mentioned hereinabove with respect to the first described embodiment of the invention (Figs. 5–13) that the distance from Stations C and B can be directly determined by use of certain differential devices. This now will be more generally developed, for combination circular-hyperbolic, circular-elliptical, and hyperbolic-elliptical systems.

Let assumptions be made as follows: (1) The system is Stations A, B and C of the system embodiment of Figures 5–13 or Figures 14 and 15; (2) $P_{Ca}$, $P_{Ea}$ and $P_{Ha}$ are carried on mobile Station C; (3) $a$ in $(Nf+a)$ is small and can be ignored (this, however, can be included in the calculation if desired), and (4) the distance from Stations A to B is AB, from Station C to A is CA, and from Station C to B is CB. CA will be found directly from the circular system, and CB is to be found.

Ignoring the part $a$ of $(Nf+a)$, the expression for the circular component can be stated:

$$X_C=\frac{Nf}{c_i}(2CA) \quad (6)$$

For the elliptical component:

$$X_E=\frac{Nf}{c_i}(Ca+CB-AB) \quad (7)$$

For the hyperbolic component:

$$X_H=\frac{Nf}{c_i}(CA-CB+AB) \quad (8)$$

The meter rotations $X_C$, $X_E$ and $X_H$ are 360° for every one-half wavelength movement of Station C. That is, for the circular case there is a 360° rotation of $P_{Ca}$ when station C moves by one-half the wavelength of $Nf$ with respect to Station A. For the elliptical case $P_{Ea}$ rotates 360° when the sum of the distances from C to A and to B changes by one-half wavelength of $Nf$. For the hyperbolic case $P_{Ha}$ rotates 360° when the difference in the distances from C to A and C to B changes by one-half wavelength of $Nf$.

Accordingly, the reading of $P_{Ca}$ in terms of rotations becomes a reading in distance if mutiplied by $$\frac{\text{wavelength}}{2} \text{ or } \frac{W}{2}$$

Multiplying both sides of expression (6) by $W/2$ gives:

$$\frac{W}{2}X_C = \frac{W}{2}\frac{Nf}{c_i}(2CA)$$

or $$X_C \text{ (Distance)} = CA \quad (9)$$

inasmuch as $$\frac{WNF}{c_i}$$

cancels out.

Similarly:

$$X_E \text{ (Distance)} = \frac{CA+CB-AB}{2} \quad (10)$$

$$X_H \text{ (Distance)} = \frac{CA-CB+AB}{2} \quad (11)$$

The sought-after CB in (10) is:

$$CB = AB - CA + 2X_E \text{ (Distance)} \quad (12)$$

and CB in 9 is:

$$CB = AB - CA + 2X_H \text{ (Distance)} \quad (13)$$

Given a circular-hyperbolic system with $P_C$ and $P_H$, CB can be solved mechanically if the shaft of $P_C$ connects to one side of a differential device and the shaft of $P_H$ is connected to a device which multiplies by 2, and the output therefrom is connected to the differential device. The output of the differential device should be multiplied by 2 to make up for the loss by 2 inherent in conventional differentials. The arrangement of devices 60, 106, 112 and 114 in Figure 5 is an example.

CB can be solved for in a circular-elliptical system in the same way as for a circular-hyperbolic system except that the output of the differential, or both differential inputs, should be reversed to give readings in the same sense.

In an elliptical-hyperbolic system CB equals $X_E$ (Distance) $-X_H$ (Distance). The mechanical solution is to connect the shaft of $P_H$ to one side of the differential, connect the shaft of $P_E$ to a reversing device (but not to a multiplying device) and the output of the reversing device to the differential. The differential output should then be multiplied by 2 to make up for the usual loss by 2.

It will be apparent that equivalent electrical circuits can be substituted for the above mentioned mechanical reversing, multiplying and differential devices, and the use of such is within the present invention.

In expressions (12) and (13) it should be noted that AB is a fixed base line distance and is involved only in the initial zeroing-in of the system. In practice a system may be zeroed in by taking the mobile craft initially to a known position with respect to Stations A and B and setting the equipment to account for all of the constants involved. In the alternative any number of mathematical approaches may be made to the problem.

From the foregoing it will be apparent that by the present invention there is provided a unique continuous wave radio navigation system or systems in which indicators are made to read directly in range to two or more points, thus simplifying navigation and obviating the need for hyperbolic, elliptical and/or circular overlays. In one embodiment circular lines of position and hyperbolic lines of position can be used to give nearly right angle intersections at distances which are large compared to the base line. The circular-hyperbolic case is similar. In still another embodiment a purely orthogonal system of intersecting hyperbolas and ellipses results to give right angle intersections of lines of positions anywhere within the area of operation. Indicating equipment may be located at any convenient point using radiation or solid conductor links, the position of the indicating equipment introducing nothing other than negligible errors in the indications. The use of different frequencies for establishing primary navigation equi-phase lines of position permits close spacing or sharing of common antenna without swamping of receivers positioned adjacent given transmitters.

The foregoing detailed descriptions of the various features of the invention have been made for purposes of illustration. The true scope of the invention is to be determined from the appended claims.

What is claimed is:

1. In a heterodyne phase comparison radio system for determining position and the like, a first station, a second station, a third station, a first oscillation means at the first station tuned to generate oscillations at a frequency $f$ and to transmit at least a portion thereof, a first receiving means at the first station and heretodyne means associated therewith, a second receiving means at the second station and heterodyne means associated therewith, a second oscillation means at the third station tuned to generate oscillations at a frequency $f'$ which differs substantially from $f$ and to transmit at least a portion thereof, a third receiving means at the third station and heterodyne means associated therewith, each one of said receiving and heterodyning means including means responsive to signals from both oscillation generating means for producing a heterodyne signal, the system further including at least two means for detecting a phase angle between electrical signals, means for conveying the heterodyne signals of one pair of the heterodyne means to the first of the phase angle means as two inputs thereto, and means for conveying the heterodyne signals of a second pair of the heterodyne means to the second of the phase angle means as two inputs thereto, the difference between $f$ and $f'$ being greater than the frequency of said heterodyne signals.

2. A system as in claim 1 wherein the two inputs to one phase angle means are from the heterodyne means of the first and third stations and the two inputs to the other phase angle means are from the heterodyne means of the first and second stations.

3. A system as in claim 2 and further including computation means, the outputs of the first and second phase angle means being coupled to the last mentioned means, the computation means comprising a differential device for determining the difference between the outputs of the phase angle means.

4. A system as in claim 1 wherein the two inputs to one phase angle means are from the heterodyne means of the first and third stations and the two inputs to the other phase angle means are from the heterodyne means of the second and third stations.

5. A system as in claim 4 and further including computation means, the outputs of the first and second phase angle means being coupled to the last mentioned means, the computation means comprising a differential device for determining the difference between the outputs of the phase angle means.

6. A system as in claim 1 wherein the two inputs to one phase angle means are from the heterodyne means of the first and second stations and the two inputs to the other phase angle means are from the heterodyne means of the second and third stations.

7. A system as in claim 6 and further including computation means, the outputs of the first and second phase angle means being coupled to the last mentioned means, the computation means comprising an addition device for determining the sum of the outputs of the phase angle means.

8. A system as in claim 1 and further including computation means, the outputs of the first and second phase angle means being coupled to the last mentioned means.

9. A system as in claim 1 and further including a fourth station having a fourth receiving means and heterodyne means associated therewith also including means responsive to signals from both oscillation means for producing a heterodyne signal, the system further including at least one additional phase angle means and means for conveying a heterodyne signal from the fourth heterodyne means and a heterodyne signal from the first or third heterodyne means thereto, the arrangement being such that with the first, second and fourth stations fixed with respect to each other and the third station mobile, the position in three dimensions of the third station is determined.

10. A heterodyne phase comparison system comprising a first sub-system as in claim 1 and a second sub-system as in claim 1, the frequencies $f$ and $f'$ of each sub-system differing from the like frequencies of the other sub-system by a predetermined amount, the arrangement being such that differences in the outputs of the related phase angle means of the respective systems provide lane resolution.

11. A system as in claim 10 and further including differential means between said related phase angle means for providing indication of lane resolution.

12. A system as in claim 1 wherein at the first station part of the output of the first oscillation means is converted by a factor N and applied to the first heterodyne means, the second oscillation means at the third station generates said signal $f'$ which is related to $f$ by $(Nf\pm a)$, and the first receiving means receive $(Nf\pm a)$ and the same is applied to the first heterodyne means whereby the heterodyne signal is the amount $a$ in $(Nf\pm a)$.

13. A system as in claim 1 wherein at the second station the receiving means comprises a first circuit for receiving frequency $f$ to the exclusion of $f'$, a second circuit for receiving $f'$ to the exclusion of $f$, and means including frequency conversion means for applying the received signals to the second heterodyne means.

14. A system as in claim 1 wherein at the third station a part of the output of the oscillation means at $f'$, which is related to $f$ by $(Nf\pm a)$, is applied without conversion to the third heterodyne means, the third receiving means receives frequency $f$, and the third station includes means for converting $f$ from the third receiving means by N and applying N$f$ to the third heterodyne means whereby the heterodyne signal is the amount $a$ in $(Nf\pm a)$.

15. A system as in claim 1 wherein at the first station part of the output of the first oscillation means is converted by a factor N and applied to the first heterodyne means, the second oscillation means at the third station generates said signal $f'$ which is related to $f$ by $(Nf\pm a)$, and the first receiving means receive $(Nf\pm a)$ and same is applied to the first heterodyne means whereby the heterodyne signal is the amount $a$ in $(Nf\pm a)$; wherein at the second station the receiving means comprises a first circuit for receiving frequency $f$ to the exclusion of $f'$, a second circuit for receiving $f'$ to the exclusion of $f$, and means including frequency conversion means for applying the received signals to the second heterodyne means; and wherein at the third station a part of the output of the oscillation means at $f'$, which is related to $f$ by $(Nf\pm a)$, is applied without conversion to the third heterodyne means, the third receiving means receives frequency $f$, and the third station includes means for converting $f$ from the third receiving means by N and applying N$f$ to the third heterodyne means whereby the heterodyne signal is the amount $a$ in $(Nf\pm a)$.

16. In a continuous wave heterodyne phase comparison radio system, first and second range stations, a relay station, first positional transmitting means at the first range station, first positional receiving means at said first range station, second positional transmitting means at said second range station, second positional receiving means at said second range station, third positional receiving means at said relay station, the first positional transmitting means being arranged to generate frequency $f$ and frequency N$f$ where N is any positive, real, rational number, the second positional transmitting means being arranged to generate frequency $(Nf\pm a)$ and frequency $$\left(f\pm\frac{a}{N}\right)$$

where frequency $f$ is substantially equal to frequency $f$ at this first transmitting means although not synchronized therewith, where N is the same number, and where $a$ is of such value that heterodyning may be carried out at the respective receiving means between N$f$ and $(Nf\pm a)$, and between $f$ and $$\left(f\pm\frac{a}{N}\right)$$

respectively, the first positional receiving means being tuned to detect and heterodyne between frequencies N$f$ and $(Nf\pm a)$ to produce heterodyne frequency $a$, the second positional receiving means being tuned to detect and heterodyne between frequencies $f$ and $$\left(f\pm\frac{a}{N}\right)$$

to produce heterodyne frequency $a/N$, one of the range stations being fixed with respect to the relay station and the other of the range stations being mobile with respect to said fixed range station and said relay station, the third positional receiving means at the relay station being tuned to heterodyne between the same frequencies received and heterodyned at the fixed range station to produce the corresponding heterodyne frequency, means including relay means, frequency conversion means and first phase comparison means for determining the phase angle between signals based on said heterodyne frequencies detected at the fixed range station and the mobile range station, respectively, for providing determination of position of the mobile station with respect to the fixed range station along concentric lines of zero phase shift about said fixed range station, and second phase comparison means connected with at least the relay means for determining the phase angle between the heterodyne frequencies detected at the fixed range station and at the relay station, respectively, for indicating the position of the mobile station along hyperbolic lines of zero phase shift with respect to the fixed range station and the relay station as foci.

17. A system as in claim 16 wherein the first range station is fixed and the second range station is mobile.

18. A system as in claim 17 including means connected between said first and second phase comparison means for comparing the outputs thereof for use in determining the absolute distance between the mobile and relay stations.

19. A system as in claim 18 wherein the comparison means includes difference determining means responsive to the phase comparison means for determining the difference between the outputs thereof.

20. A system as in claim 18 wherein the comparison means includes addition determining means responsive to the respective phase comparison means for adding the indications of said respective phase comparison means.

21. A system as in claim 16 wherein the second range station is fixed and the first range station is mobile.

22. A system as in claim 16 including means connected between said first and second phase comparison means for comparing the outputs thereof, said means including means for multiplying the output of the second phase comparison means by a factor of at least approximately 2 for use in determining the absolute distance between the mobile and relay stations.

23. A system as in claim 16 and further including a second relay station spaced apart and fixed with respect to the fixed range station and first mentioned relay station, fourth positional receiving means at the second relay station tuned to heterodyne between the same frequencies heterodyned at the fixed range station, and third phase comparison means connected at least to the relay means for determining the phase angle between the heterodyne signals as detected at the fixed range station and second relay station for providing indication of the position of the mobile station along hyperbolic lines of zero phase shift with respect to the fixed range station and second relay station as foci.

24. A system as in claim 16 and further including additional phase comparison means connected at least to the relay means for heterodyning between the same radio frequencies as detected at the mobile range station and the relay station for indicating the position of the mobile station along elliptical lines of zero phase shift with respect to the fixed range station and the relay station as foci.

25. A system as in claim 16 and further including means connected between said first and second phase comparison means for comparing the outputs thereof for use in determining the absolute distance between the mobile and relay stations.

26. A system as in claim 25, wherein the comparison means includes difference determining means responsive to the phase comparison means for determining the difference between the outputs thereof.

27. A system as in claim 25, wherein the comparison means includes addition determining means responsive to the respective phase comparison means for adding the indications of said respective phase comparison means.

28. A system as in claim 16 and further including means for resolving lane ambiguities, said means including arrangement of said transmitting means at the first and second range stations for generating at least one additional frequency and frequency differing therefrom distinct from the low frequencies recited in claim 16, the system further including arrangement of said receiving means at the first range station, the second range station and the relay station for heterodyning the just mentioned radio frequencies, additional means including signal relaying means, frequency conversion means and additional phase comparison means for measuring the phase angle between the heterodyne signals so detected for providing positional data in terms of a distinct pattern of concentric circular lines about the fixed range station and along hyperbolic lines having the fixed range station and relay station as foci, whereby the differential between the respective phase readings for the distinct patterns of circular and hyperbolic lines of zero phase shift provides a vernier indication of circular and hyperbolic lanes.

29. A system as in claim 28 and including differential indicating means connected between the respective circular and hyperbolic phase comparison means to provide said vernier indication.

30. In a continuous wave heterodyne phase comparison radio system, first and second range stations, a relay station, first transmitting means and first receiving means at said first range station, second transmitting means and second receiving means at said second range station, third positional receiving means at said relay station, the first positional transmitting means being arranged to generate frequencies $f_1$, $Mf_1$, $f_2$, and $Nf_2$, where $f_1$ and $f_2$ are distinct frequencies and where $M$ may be any positive, real, rational number, and where $N$ may be any positive, real, rational number, the second positional transmitting means being arranged to generate frequencies $(Mf_1 \pm a)$, $$\left(f_1 \pm \frac{a}{M}\right)$$

$(Nf_2 \pm b)$ and $$\left(f_2 \pm \frac{b}{N}\right)$$

where $f_1$ and $f_2$ are substantially equal to the $f_1$ and $f_2$ emitted from the emitting means at the first fixed station, where $M$ and $N$ correspond to the values of $M$ and $N$ for the first positional transmitting means and wherein $a$ and $b$ are separable if existing as discrete frequencies, the first positional receiving means being arranged to heterodyne between frequencies $Mf_1$ and $(Mf_1 \pm a)$, and between $Nf_2$ and $(Nf_2 \pm b)$ to provide heterodyne frequencies $a$ and $b$, and second positional receiving means being arranged to heterodyne between the frequencies $f_1$ and $$\left(f_1 \pm \frac{a}{N}\right)$$

and between $f_2$ and $$\left(f_2 \pm \frac{b}{N}\right)$$

to provide heterodyne frequencies $a/M$ and $b/N$, one of the range stations being fixed and the other mobile with respect to the relay station, the third positional receiving means at the relay station being tuned to heterodyne between the frequencies also heterodyned at the fixed range station to produce the heterodyne frequencies there produced, means including signal relaying means, frequency converting means and first phase comparison means for measuring the phase angle between signals based on said heterodyne frequencies $a$ and $(a/M)$ detected at the first positional receiving means and second positional receiving means, respectively, for providing a pattern of circular lines of zero phase shift for the mobile range station about said fixed range station, second phase comparison means connected at least with the signal relaying means for measuring the phase angle between signals based on said heterodyne frequencies detected at the fixed range station and the relay station, respectively, for providing a pattern of hyperbolic lines of zero phase shift for the mobile range station with respect to said fixed range and relay stations as foci, third phase angle measuring means connected at least to the signal relaying means for measuring the phase angle between signals based on said heterodyne frequencies $b$ and $b/N$ detected at the fixed and mobile range station, respectively, for providing a distinct pattern of circular lines of zero phase shift for the mobile station about said fixed range station, and fourth phase comparison means connected at least with the signal relaying means for measuring the phase angle between said heterodyne frequencies detected at the fixed range and relay stations, respectively, for providing a distinct pattern of hyperbolic lines of zero phase shift for the mobile range station with respect to said fixed range station and the relay station as foci, the arrangement being such that the differential between the first and third phase comparison means provides a vernier indication of circular lane position, and the differential between the second and fourth phase comparison means provides a vernier indication of hyperbolic lane position.

31. A system as in claim 30 wherein the first range station is fixed and the second range station is mobile.

32. A system as in claim 30 wherein the second range station is fixed and the first range station is mobile.

33. A system as in claim 30 and further including differential means connected between the first and third phase comparison means for comparing the outputs thereof for providing said vernier indication of circular lane position, and further means connected between the second and fourth phase comparison, means for comparing the outputs thereof for providing said vernier indication of hyperbolic lane position.

34. In a continuous wave heterodyne phase comparison radio position determining system, first and second range stations, a relay station, first transmitting means and first receiving means at said first range station, second transmitting means and second receiving means at said second range station, third positional receiving means at said relay station, the first transmitting means being arranged to generate frequencies $f$, $Mf$ and $Nf$, where $f$ is a predetermined frequency and $M$ and $N$ are any two real, positive and rational but different numbers, the second transmitting means being arranged to generate frequencies $(Mf\pm a)$, $$\left(f\pm\frac{a}{M}\right), (Nf\pm b) \text{ and } \left(f\pm\frac{b}{N}\right)$$

where $f$ is substantially equal to frequency $f$ generated at the first transmitting means, wherein $M$ and $N$ are the same different numbers as at the first transmitting means and $a$ and $b$ are separable if existing as discrete frequencies, the first receiving means being tuned to detect and heterodyne between frequencies $Mf$ and $(Mf\pm a)$ to produce the heterodyne frequency $a$, and to heterodyne between frequencies $Nf$ and $(Nf\pm b)$ to produce the heterodyne frequency $b$, the second receiving means being tuned to detect and heterodyne between frequencies $f$ and $$\left(f\pm\frac{a}{M}\right)$$

to produce the heterodyne frequency $a/M$, and to heterodyne between frequencies $f$ and $$\left(f\pm\frac{b}{N}\right)$$

to produce the heterodyne frequencies $b/N$, one of the range stations being fixed and the other range station being mobile with respect to the fixed range station and the relay station, the third receiving means being tuned to detect and heterodyne between the same frequencies also detected and heterodyned at the fixed range station to produce the heterodyne frequencies there produced, means including signal relaying means, frequency converting means and first phase comparison means for measuring the phase angle between signals based on said heterodyne frequencies $a$ and $a/M$ detected at the first receiving means and second receiving means, respectively, for providing a pattern of circular lines of zero phase shift for the mobile range station about said fixed range station, second phase comparison means connected at least with the signal relaying means for measuring the phase angle between signals based on said heterodyne frequencies detected at the fixed range station and the relay station, respectively, for providing a pattern of hyperbolic lines of zero phase shift for the mobile range station with respect to said fixed range station and relay station as foci, third phase angle measuring means connected at least to the signal relaying means for measuring the phase angle between signals based on said heterodyne frequencies $b$ and $b/N$ detected at the fixed and mobile range stations, respectively, for providing a distinct pattern of circular lines of zero phase shift for the mobile station about said fixed range station, and fourth phase comparison means connected at least with the signal relaying means for measuring the phase angle between said heterodyne frequencies detected at the fixed range station and the relay station, respectively, for providing a distinct pattern of hyperbolic lines of zero phase shift for the mobile range station with respect to said fixed range station and the relay station as foci, the arrangement being such that the differential between the first and third phase comparison means provides a vernier indication of circular lane position, and the differential between the second and fourth phase comparison means provides a vernier indication of hyperbolic lane position.

35. A system as in claim 34 wherein the first range station is fixed and the second range station is mobile.

36. A system as in claim 34 wherein the second range station is fixed and the first range station is mobile.

37. A system as in claim 34 and further including differential means connected between the first and third phase comparison means for comparing the outputs thereof for providing said vernier indication of circular lane position, and further differential means connected between the second and fourth phase comparison, means for comparing the outputs thereof for providing said vernier indication of hyperbolic lane position.

38. In a continuous wave heterodyne phase comparison radio system, first and second range stations, a relay station, first positional transmitting means at the first range station, first positional receiving means at said first range station, second positional transmitting means at said second range station, second positional receiving means at said second range station, third positional receiving means at said relay station, the first positional transmitting means being arranged to generate frequency $f$ and frequency $Nf$ where $N$ is any positive, real, rational number, the second positional transmitting means being arranged to generate frequency $(Nf\pm a)$ and frequency $$\left(f\pm\frac{a}{N}\right)$$

where frequency $f$ is substantially equal to frequency $f$ at the first transmitting means although not synchronized therewith, where $N$ is the same number, and where $a$ is of such value that heterodyning may be carried out at the respective receiving means between $Nf$ and $(Nf\pm a)$, and between $f$ and $$\left(f\pm\frac{a}{N}\right)$$

respectively, the first positional receiving means being tuned to detect and heterodyne between frequencies $Nf$ and $(Nf\pm a)$ to produce heterodyne frequency $a$, the second positional receiving means being tuned to detect and heterodyne between frequencies $f$ and $$\left(f\pm\frac{a}{N}\right)$$

to produce heterodyne frequency $a/N$, one of the range stations being fixed with respect to the relay station and the other of the range stations being mobile with respect to said fixed range station and said relay station, the third positional receiving means at the relay station being tuned to heterodyne between the same frequencies received and heterodyned at the fixed range station to produce the corresponding heterodyne frequency, means including relay means, frequency conversion means and first phase comparison means for determining the phase angle between signals based on said heterodyne frequencies detected at the mobile range station and the relay station, respectively, for providing determination of position of the mobile station with respect to the fixed range and relay stations along elliptical lines of zero phase shift about said fixed range and relay stations as foci, and second phase comparison means connected with at least the relay means for determining the phase angle between the heterodyne frequencies detected at the fixed range station and at the relay station, respectively, for indicating the position of the mobile station along hyperbolic lines of zero phase shift with respect to the fixed range station and the relay station as foci.

39. A dual channel receiver for receiving distinct radio frequencies $f$ and $(Nf\pm a)$, where $f$ is a radio frequency, $N$ is any real, positive, rational number and ($Nf \pm a$) does not exceed the allocated bandwidth for $Nf$, comprising a radio frequency amplifier for frequency $f$, a local intermediate frequency oscillator tuned to operate at frequency $f_1$, a mixer circuit for mixing frequencies $f$ and $f_1$, a frequency multiplier circuit for multiplying the mixed frequencies by factor of N, a radio frequency amplifier for frequencies ($Nf \pm a$), a frequency multiplication circuit connected with the output of said local oscillator to multiply frequency $f_1$ by the factor N, a mixer circuit connected with the last mentioned doubler circuit and with the ($Nf \pm a$) amplifier for mixing said signals, and a further mixer circuit for mixing signals derived from the last mentioned mixer circuit and the first mentioned multiplication circuit, and detection means connected with the final mixer circuit for detecting said frequency $a$ as a separate heterodyne frequency.

No references cited.